United States Patent [19]

Clancy et al.

[11] Patent Number: 4,540,985

[45] Date of Patent: Sep. 10, 1985

[54] ANGLE WIDTH DISCRIMINATOR/ALTITUDE LINE DETECTOR RADAR

[75] Inventors: Steven J. Clancy, Elkridge; James F. Whatley, Catonsville; Dennis Heinke, Columbia, all of Md.

[73] Assignee: Westinghouse Electric Corp., Pittsburgh, Pa.

[21] Appl. No.: 911,867

[22] Filed: Jun. 2, 1978

Related U.S. Application Data

[63] Continuation-in-part of Ser. No. 908,603, May 23, 1978, abandoned.

[51] Int. Cl.³ .............................................. G01S 7/44
[52] U.S. Cl. .................................. 343/5 DP; 343/7 A
[58] Field of Search ....................... 343/5 DP, 5 VQ

[56] References Cited

U.S. PATENT DOCUMENTS

| | | | |
|---|---|---|---|
| 3,353,177 | 11/1967 | Wilmot | 343/5 VQ |
| 3,680,095 | 7/1972 | Evans | 343/5 VQ X |
| 3,836,964 | 9/1974 | Evans | 343/5 VQ X |
| 3,940,762 | 2/1976 | Ethington et al. | 343/5 VQ |
| 4,062,012 | 12/1977 | Colbert et al. | 343/5 DP X |

*Primary Examiner*—T. H. Tubbesing
*Attorney, Agent, or Firm*—C. F. Renz

[57] ABSTRACT

A pulse radar for acquiring a target while rejecting the altitude line is described wherein a plurality of target reports from a scanning antenna are examined and rejected if the pattern of target reports at an apparent range extends along a scanning angle too large to be a valid target and selected if the pattern of target reports at a range extends along a limited scanning angle indicative of a target having a valid target size. Target reports rejected during a prior scan may be used as a basis for rejecting target reports of a current scan.

4 Claims, 9 Drawing Figures

ANGLE WIDTH DISCRIMINATOR/ALTITUDE LINE DETECTOR RADAR

CROSS-REFERENCE TO RELATED APPLICATIONS

This is a continuation-in-part of Ser. No. 908,603 filed May 23, 1978, now abandoned.

BACKGROUND OF THE INVENTION

1. Field of the Invention

The present invention relates to a pulse radar with a scanning antenna to acquire targets; and, more particularly, to automatic acquisition of targets in an air combat situation prior to tracking the target or lock-on.

2. Description of the Prior Art

Automatic acquisition modes in non-coherent pulse-mode radars are plagued with interference from clutter returns arising from backscatter where the beam impinges upon the ground or from side lobes of the beam impinging the ground approximately below the antenna. Side lobe reflections from the ground below the antenna are especially troublesome because they are present for all pointing directions of the radar antenna in that some side lobe radiation is always reflected by the ground to the antenna. These radar return signals have been called "altitude lines" by radar operators because they cause a line to appear on a B-scope display at a range equal to the actual altitude during azimuth scans of the antenna. As the pilot tries to point his aircraft such that the target is within the antenna search scan pattern, he can get an unwanted radar tracking lock on the altitude line due to its presence before the target is illuminated by the antenna. If the altitude is less than the range or distance to the desired target, the altitude line will be acquired by the radar even if the antenna is illuminating the desired target. This is because the altitude line is interpreted to be greater threat by the automatic acquisition circuitry since it is nearer in range.

Previous attempts at solving the problem of an unwanted radar tracking lock on the altitude line included pulse width discrimination, sensitivity time control and gain tuning, and altitude line tracking and blanking. Of these approaches, only altitude line tracking has been successful. This has involved a special altitude line detection antenna scan and special tracking hardware. This approach adds significant time delays in the target acquisition process and adds to the radar hardware costs and complexity.

It is therefore desirable to provide a means and method for acquiring desired targets while at the same time rejecting the altitude line since the pilot must be confident that his radar has locked on the desired target for the automatic acquisition mode of the radar to be useful in combat.

It is further desirable that all returns from the side lobe, as well as the main beam, are processed by the same circuitry. By using the same circuitry, identical detection sensitivities and range measurement accuracies are maintained for both desired and undesired returns. This overcomes the problems encountered in those methods where separate circuitry is used to detect and track the undesired returns.

It is further desirable to reject target reports that extend over an antenna scan angle that is too large to be a valid target.

It is further desirable to select target reports which extend over a limited scan angle by the antenna indicative of a target having a valid target size.

It is further desirable to use target reports rejected during a prior scan as a basis for rejecting target reports of a current scan.

SUMMARY OF THE INVENTION

In accordance with the present invention, a method and means for operating a pulse radar is provided for acquiring a target comprising the steps of transmitting a sequence of signals from an antenna, the antenna radiating most of the electromagnetic energy in a narrow beam having a predetermined beam width, scanning the antenna to direct the beam along a predetermined path represented by a plurality of path increments connected in series, receiving reflected signals emanating from said antenna, integrating a plurality of the reflected signals arriving at the antenna at a predetermined time interval corresponding to a range cell and path increment for the directed beam to provide an output signal, thresholding the output signal to provide a target report at times when the amplitude of the output signal is greater than a predetermined value, repeating the steps of receiving and thresholding for a plurality of time intervals for each of a plurality of path increments for the directed beam, storing the target reports, comparing the occurrence of the target reports as a function of the plurality of path increments and range cell location with a plurality of predetermined target report patterns and selecting target reports having an occurrence matching one of said predetermined target report patterns indicative of a target having a valid target size.

The invention further provides performing the steps of transmitting, scanning, receiving, integrating, thresholding, repeating and storing during a second scan, storing rejected target reports of the first scan, rejecting target reports stored during a second scan when the target reports of the second scan occur within a predetermined distance of the range cell and path increment of the rejected target reports of the first scan, comparing the occurrence of the target reports from the second scan as a function of the plurality of increments and range cell location with a plurality of predetermined target report patterns, and selecting target reports having an occurrence matching one of said predetermined target report patterns indicative of a target having a valid target size.

DESCRIPTION OF THE PREFERRED EMBODIMENTS

Figure 1:
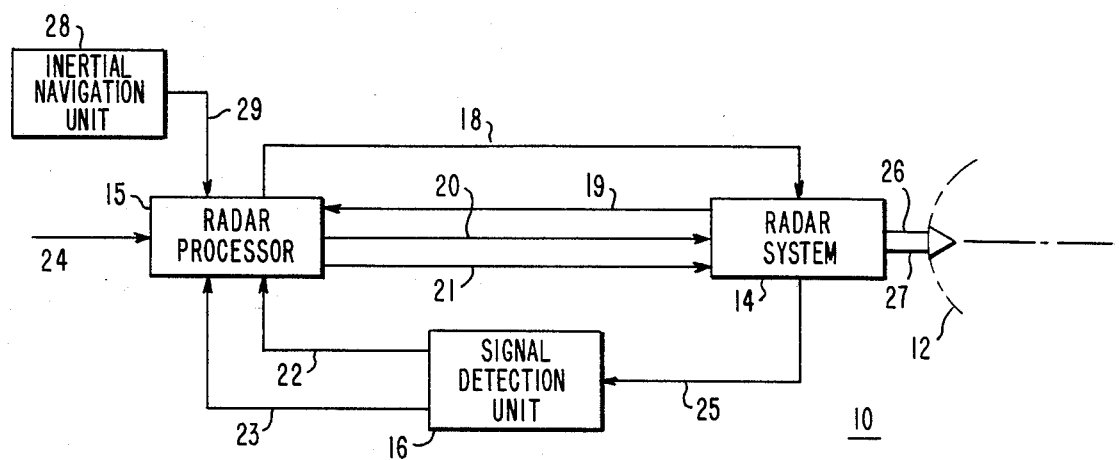
FIG. 1 is a functional block diagram of one embodiment of the invention.

Referring now to the drawings, FIG. 1 shows one embodiment of the invention. Automatic acquisition radar 10 comprises antenna 12, radar system 14, radar processor 15 and signal detection unit 16. Radar processor 15 functions to control the scanning of antenna 12 by antenna position commands coupled over line 18 to an input of radar system 14. Radar system 14 functions to determine the pointing direction or provide resolver signals of antenna 12 and to couple the antenna resolver signals over line 19 to an input of radar processor 15. Radar processor 15 couples commands over line 20 to an input of radar system 14. Radar processor 15 couples a target range position over line 21 to an input of radar system 14. After automatic acquisition radar 10 has acquired a target, the target range position or the range of the target is supplied to a tracking circuit within radar system 14 which will cause the radar system 14 to track in range the desired target in response to a lock-on command from radar processor 15 over line 20. Radar processor 15 receives target reports from signal detection unit 16 over line 22. An interrupt command is generated by signal detection unit 16 and is coupled over line 23 to an input of radar processor 15, which functions to interrupt radar processor 15 to receive the detection reports on line 22. Radar processor 15 may receive start, initiate and halt commands for overall control of automatic acquisition radar 10 by a control operator or a control processor over line 24.

Radar processor 15 may have a plurality of registers, including an instruction accumulator, multiplier quotient, index, effective address, instruction counter, instruction, instruction buffer, memory operand, instruction register save, operation counter, block (MSB of address) and carry overflow register. Processor 15 may have an instruction set which includes at least an ADD, NAND, SUBTRACT, LOAD, STORE, INPUT, OUTPUT, CONDITIONAL BRANCH and SHIFT instructions for operating upon data transferred to the processor over lines 19 and 22 in accordance with the particular instruction in the instruction register of processor 15. Processor 15 has an input/output port responsive to control signals including HALT, INITIATE, CLEAR, and INTERRUPT coupled over lines 23 and 24. Processor 15 includes memory storage for both operand and instruction fetches. Processor 15 includes means for resetting all registers to zero in response to a clear control signal received on line 24. Processor 15 includes, for example, means for causing an instruction to be fetched and executed in response to an initiate control signal received on line 24. Processor 15 includes, for example, means for halting the fetching and execution of instructions in response to a halt control signal received on line 24. The input/output port of processor 15 includes logic for receiving, decoding and generating initiate, halt, clear and interrupt commands received on line 23.

Signal detection unit 16 functions to receive a video signal corresponding to the reflected signals received by antenna 12 over line 25. Signal detection unit 16 functions to generate target reports after processing received reflected signals which may include actual targets, the altitude line and main beam clutter. Specifically, signal detection unit 16 integrates a plurality of reflected signals arriving at the antenna 12 at a predetermined time interval corresponding to a range cell and path increment or antenna position where the main beam has been directed to provide an output signal. Signal detection unit 16 provides integration and thresholding for a plurality of time intervals for each of a plurality of path increments or antenna positions where the beam has been directed. The target reports are transferred to the radar processor 15 over line 22.

Antenna 12 functions to radiate most of the electromagnetic energy fed to the antenna into a narrow beam having a predetermined beam width, for example, six degrees.

Radar system 14 functions to transmit a sequence of signals which are fed to antenna 12 over lines 26 and 27 and to position or scan antenna 12 to direct the beam along a predetermined path represented by a plurality of path increments connected in series. Radar system 14 functions to receive reflected signals emanating and arriving back at antenna 12, to remove the carrier signal therefrom to provide a signal on line 25 indicative of the amplitude of the received reflected signals, such as a wide band video amplitude signal.

The antenna position information which is fed over line 19 to radar processor 15 indicates the position of the antenna relative to coordinates or position of the radar system. It is understood that the radar system 14 may be stationary or moving, such as in an airplane or ship. The coordinates of the radar system 14 are related to geographical coordinates of the earth through an inertial navigation unit 28 which provides suitable information over line 29 to radar processor 15. Radar processor 15 tags the detection reports with the antenna position or direction of the radar beam. The antenna coordinates or position of the radar beam is converted to space stabilization coordinates, such as geographical coordinates utilizing the information from inertia navigation unit 28 to facilitate correlating target reports as a function of a range cell and azimuth. With this arrangement, the motion of the air frame and the radar system 14 attached thereto is accounted for.

Radar processor 15 stores or places in memory target reports received on line 22. Radar processor 15 examines the occurrence of the target reports as a function of the plurality of path increments or antenna position and range cell location. Radar processor 15 rejects target reports indicative of a target which within at least one range cell extends over a plurality of path increments or antenna scan angle that is too large to be a valid target. Radar processor 15 selectes target reports indicative of a target having a valid target size, for example, from two to three target reports in an antenna scan path scanning at 120°/sec. with a 6° wide beam without target reports for a predetermined scan path before or after the target reports.

Figure 2:
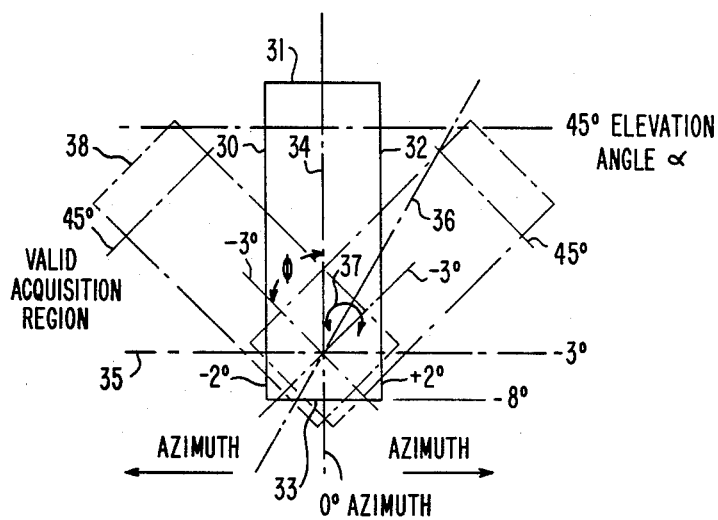
FIG. 2 is a diagram of a suitable antenna scan pattern for the embodiment of FIG. 1.

FIG. 2 is a diagram of a suitably antenna scan pattern for the embodiment in FIG. 1. The elevation angles provided in FIG. 2 are referenced to the position of radar system 14. As shown in FIG. 2, the antenna 12 may scan as shown by line 30 from −3° elevation to +45° elevation, providing a total scan angle of 48°. Line 31 shows a scan turn-around region which is above 45° elevation where the antenna is moved from −2° azimuth to +2° azimuth. The antenna is then scanned from +45° elevation to −3° elevation, providing a scan angle of 48°, as shown by line 32. Curve 33 shows the antenna moving below −3° elevation from +2° to −2° azimuth. The antenna is moved during scanning from line 30 to line 32 to provide better coverage of targets which may be at the edge of the beam during a particular scan. If the antenna 12 and radar system 14 are rotated about reference line 36 which is orthogonal to the elevation and horizontal azimuth directions, the scan pattern will traverse a volume of space to illuminate the target at shown by patterns in phantom lines. Rotation can be accomplished by an aircraft rolling.

Figure 4:
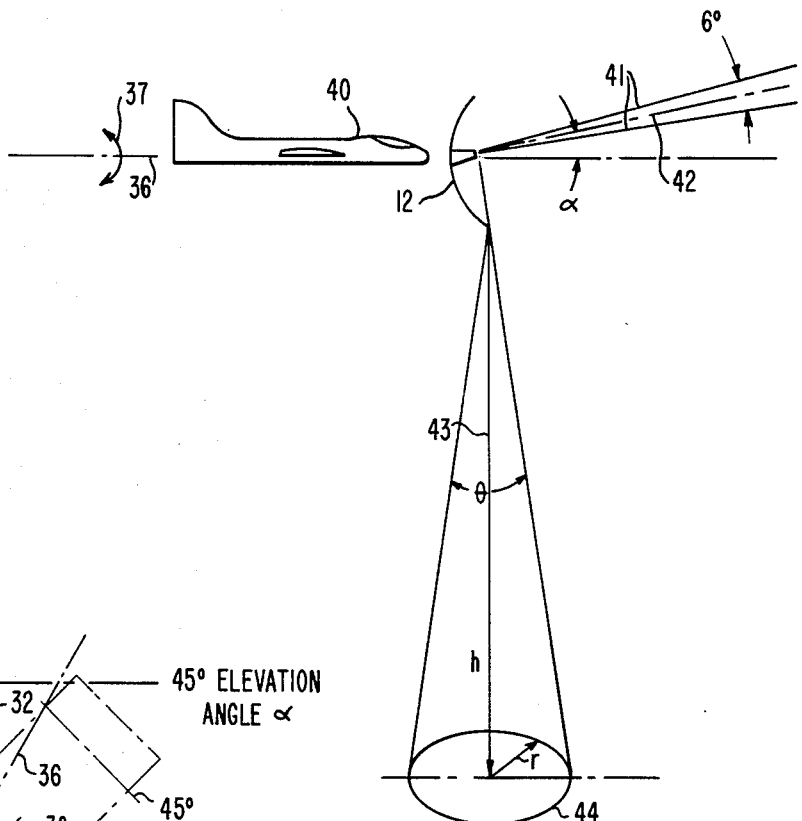
FIG. 4 is a diagram of the altitude line clutter caused by side lobes from the antenna.

In FIG. 2 the elevation direction is indicated by reference line 34, the azimuth direction by reference line 35. The axis of rotation for rotating the scan pattern is shown by reference line 36 and arrow 37. The scan pattern may be rotated counterclockwise or clockwise as shown by arrow 37 to illuminate a target. FIG. 4 shows an airplane and antenna 12 in relation to the axis of rotation 36. The angle of rotation from the vertical direction with reference to geographic coordinates is indicated by angle $\phi$ in FIG. 2. The scan pattern which has been rotated through an angle $\phi$ is shown in phantom by scan pattern 38.

Figure 3:
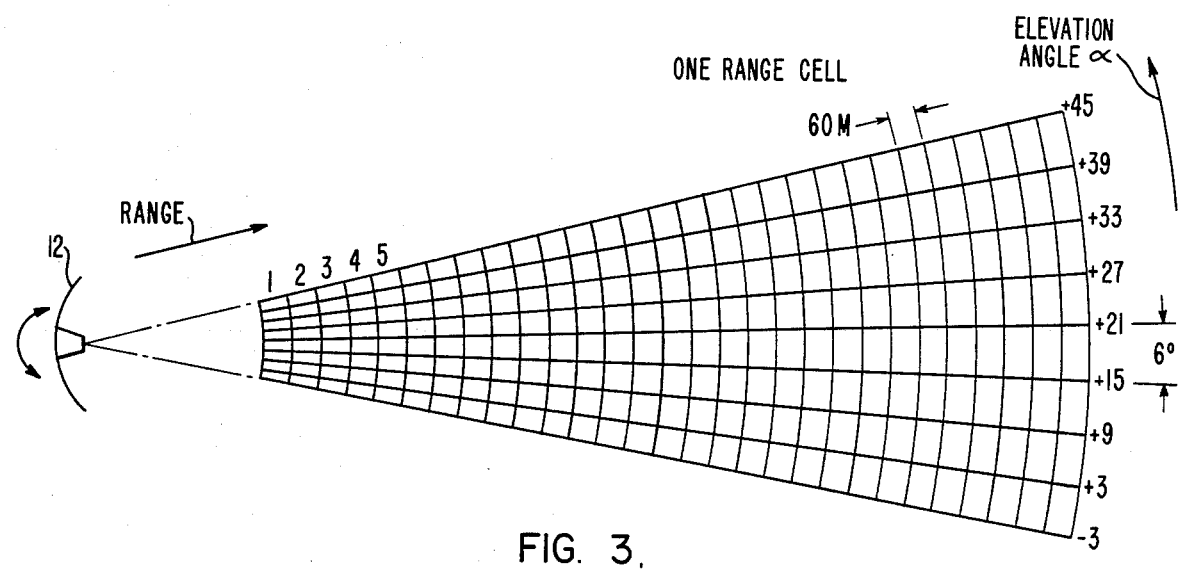
FIG. 3 is a diagram showing the special relationship of the main beam scan pattern of FIG. 2.

FIG. 3 is a diagram showing the spatial relationship of the main beam scan pattern, such as line 30 or 32 of FIG. 2. The main beam, as radiated from antenna 12, scans through an elevation angle from $-3°$ to $+45°$. As shown in FIG. 3, the beam width is approximately 6° wide. In actual practice, the beam dwells on a target to get three target reports. Reflected signals arriving at 400 nanosecond time intervals are quantized by the signal detection unit 16 in FIG. 1. The 400 nanosecond time interval represents one range cell along a particular elevation angle $\alpha$. In a conventional radar, the first 900 ft. from the antenna 12 may be ignored with the range cells running from 274 meters out to 15.36 kilometers, forming 256 contiguous range cells, each range cell being 60 meters long. Target reports from signal detection unit 16 indicate reflected signals were received at a time corresponding to a particular range cell and elevation angle.

FIG. 4 is a diagram of the altitude line clutter caused by side lobes from the antenna. In FIG. 4, airplane 40 has an antenna 12 emanating a main beam 41 of electromagnetic radiation having a beam width of approximately 6°, directed in space at an elevation angle $\alpha$. Antenna 12, shown out of scale in FIG. 4 for the purposes of illustration, radiates a significant number of side lobes. For example, if antenna 12 is a parabolic dish antenna it would have side lobes at an angle of 60° to 90° off the center reference line 42 of the main beam 41. FIG. 2 shows diagrammatically the area on the ground that contributes to the peak of the altitude line return. Analysis shows it to be a disc which subtends angles of 29° and 17° at the antenna 12 for radar altitudes of 1.83 kilometers and at 5.49 kilometers, respectively. Thus, the altitude line represents an average of returns or reflected signals from a large number of side lobes near 90° from the main beam 41. As the antenna sweeps in elevation, the side lobes that are averaged change slightly because of the large subtended angle included. Thus, if an altitude line return exceeds the detection threshold at the beginning of an elevation scan, such as lines 30 or 32 in FIG. 2, it is likely to exceed the threshold for the entire elevation scan. In FIG. 4, the radius of the area on the ground that contributes to the peak of the altitude line return is described by equation 1:

$$r \approx \sqrt{c\tau h} \quad (1)$$

where c is the speed of light, $\tau$ is the pulse width and h is the altitude. The angle $\theta$ subtended at the antenna by the side lobes may be estimated utilizing equation 2.

$$\theta = 2 \tan^{-1} \sqrt{\frac{c\tau}{h}} \quad (2)$$

Figure 5:
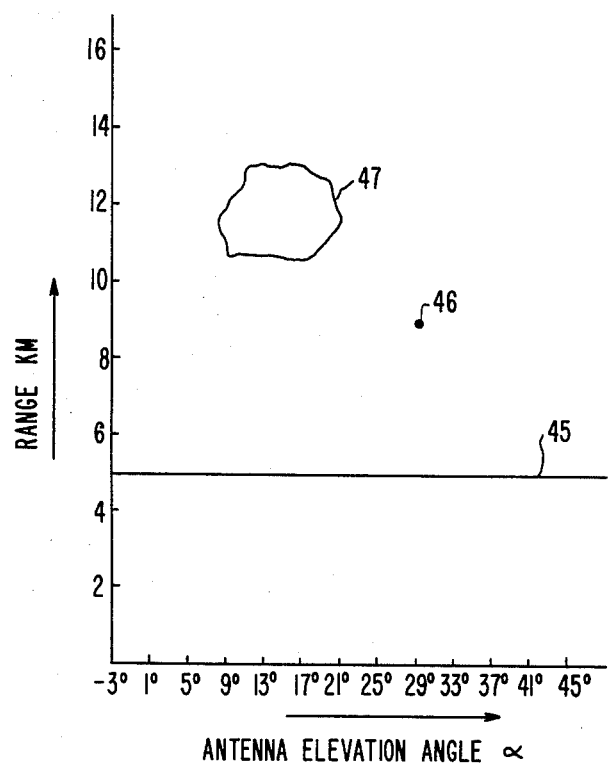
FIG. 5 is a typical B-scope display of the target in the presence of main beam clutter and altitude line clutter prior to rejecting the altitude line.

FIG. 5 is a typical B-scope display of the target in the presence of main beam clutter and altitude line clutter. In FIG. 5 the ordinate represents range in kilometers and the abscissa represents antenna elevation angle $\alpha$. As the antenna is scanned in elevation from $-3°$ to $+45°$, altitude line clutter appears on the B-scope and continues to appear as the main beam is scanned upwards. The altitude line 45 is shown in FIG. 5. A target 46 is illuminated by the radar main beam at an elevation angle of 29° and a range of approximately 9 kilometers. An airplane at a range of 9 kilometers may be approximated as a point target. An area of main beam clutter 47 is shown when the main beam is at an elevation angle from 8° through 21° and a range of between 10½ and 13 kilometers. The main beam clutter may return an exceptionally strong signal, for example, if the main beam was reflected off a mountainside. The main beam clutter may appear on the B-scope at the range it impinges upon the ground if the reflected clutter signals exceed the threshold amplitude of the detector. Since close-in targets would return a strong reflected signal, a sensitivity control means is normally provided to adjust the gain from 0 to 8 kilometers.

Figure 6:
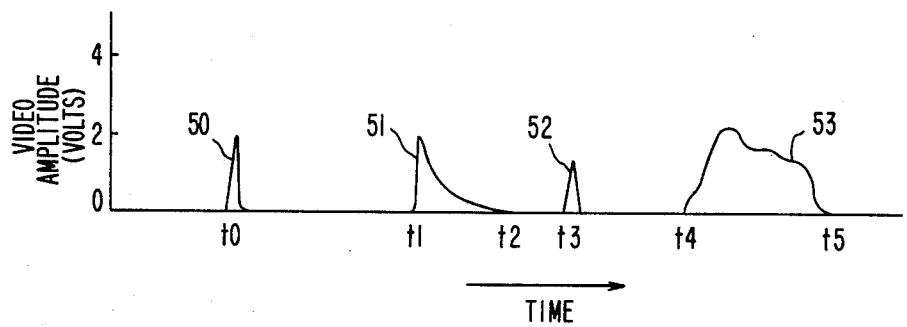
FIG. 6 shows video wave forms of reflected signals at the antenna.

FIG. 6 shows a video wave form of reflected signals on line 25 of FIG. 1. The ordinate represents volts and the abscissa represents time. At time t0 a pulse of electromagnetic energy is radiated by antenna 12. Curve 50 at time t0 represents a small amount of signal leakthrough from the transmitter to the video signal line 25. After the transmitted pulse, curve 50 goes back to zero volts. No signals are received until time t1 when the altitude line 51 occurs due to signals reflecting from the ground below the radar antenna 12. As can be seen in FIG. 6, the altitude line extends from t1 to t2. At time t3, a point target, such as an airplane, provides reflected signals as represented by curve 52. As shown in FIG. 6, the duration of curve 52 is relatively short. At time t4, main beam clutter is received which extends through time t5. As shown in FIG. 6, curve 53 has a relatively long duration as compared to a point target, curve 52.

Figure 7:
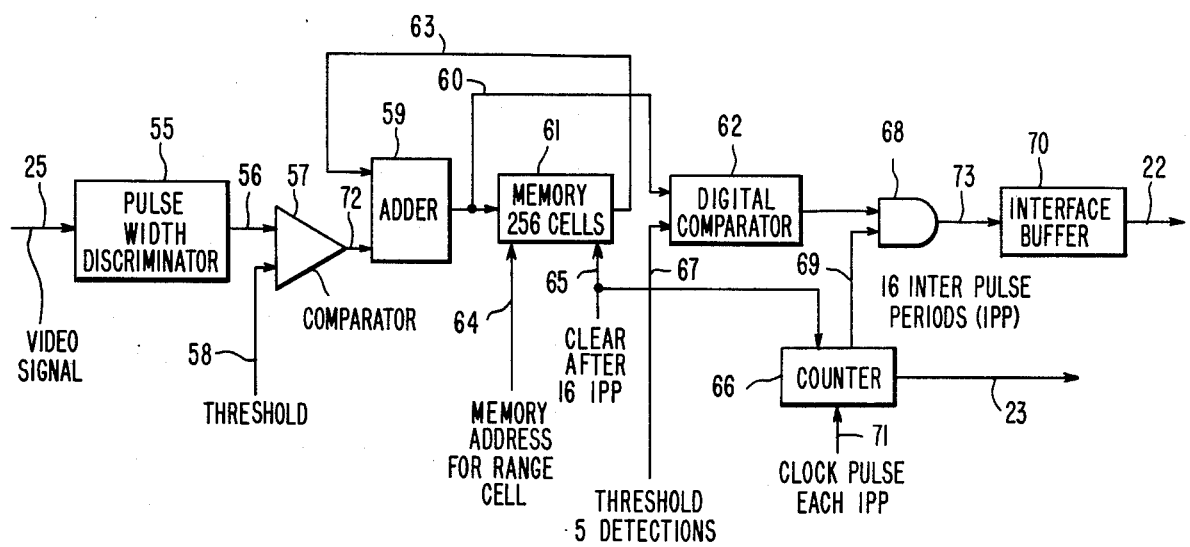
FIG. 7 shows one embodiment for generating target reports from the video or reflected signals.

FIG. 7 shows one embodiment for generating target reports. The video signal on line 25 is coupled to an input of pulse width discriminator 55 having an output coupled over line 56 to an input of comparator 57. A threshold voltage which may vary over time is coupled over line 58 to a second input of comparator 57. The output of comparator 57 is coupled over line 72 to an input of adder 59. The output of adder 59 is coupled over line 60 to a data input of memory 61 and an input of digital comparator 62. The output of memory 61 is coupled over line 63 to an input of adder 59. An address signal is coupled over line 64 to an address input of memory 61. A clear signal is coupled over line 65 to memory 61 and to counter 66, which functions to clear or dump the memory and counter to zero. A digital threshold signal, such as the number 5, is coupled over line 67 to an input of digital comparator 62. The output of digital comparator 62 is coupled to an input of AND gate 68. An output of counter 66 is coupled over line 69 to a second input of AND gate 68. The output of AND gate 68 is coupled over line 73 to an input of interface buffer 70 having an output coupled to line 22. An output of counter 66 is coupled to line 23 which functions to provide an interrupt signal. A clock pulse for each interpulse period is coupled over line 71 to an input of counter 66, which functions to advance the counter at the beginning of each interpulse period.

The radar video signal on line 25 is processed through pulse width discriminator 55 which may, for example, include a bipolarizing delay line to permit pulse width discrimination against wide returns, such as clutter. The video signal from discrete targets, even those riding on clutter, will pass through the bipolarizing pulse width discrimination circuitry 55. The bipolar video is fed to a comparator that has an output of a "logic one" if the video exceeds a predetermined threshold which is based on allowable false alarm rates. These decisions or the output of comparator 57 are integrated on a range cell by range cell basis by memory 61 and adder 59 for sixteen interpulse periods. The results of the integration are fed to an input of digital comparator 62 for further processing and memory 61 is cleared (dumped) at the conclusion of the sixteen interpulse periods (IPP's). This integrate and dump detection process is repeated every sixteen milliseconds, for example.

The detection criteria utilized is based on achieving a probability of false alarm greater than $10^{-10}$ and less than $10^{-5}$. In addition, for a detection probability which is greater than 0.5 and less than 0.9 then $M_{optimum}$ is approximately equal to $1.5 \times$ square root of k for a fluctuating target, where k equals the number of detections possible and $M_{optimum}$ equals the number of detections necessary to have the probability of detection and the probability of false alarm to be within their desired ranges. $M_{optimum}$ is equal to 6 detections. Thus, digital comparator 62 functions to find which range cells integrated up to six or more hits out of the sixteen interpulse periods. The integrate and dump target detection scheme will detect both target and altitude line returns. Target returns will tend to be in one or two adjacent range cells since the range cells are matched to the transmitted pulse width. The altitude line returns will be in one or more contiguous range cells, depending on the orientation of the air frame to the terrain below it and on the actual altitude of the aircraft since the sensitivity time control of threshold signal 58 is applied to returns out to about 6.4 kilometers. By looking for leading edges of groupings of threshold detections in range, targets and altitude line returns can be identified with a single range cell number. The single range cell number may be utilized to minimize overloading the interface line 22 in FIG. 1.

The integrate and dump detector works for sixteen interpulse periods which at the completion after sixteen milliseconds, interface buffer 70 sends the first or nearest four detected leading edge range numbers over line 22 to an input of radar processor 15 for correlation with detections from other beam pointing positions in the elevation scan.

In operation, radar processor 15 commands antenna 12 to scan through the pattern shown in FIG. 2. Assuming that the antenna scans at 120° per second and that the effective detection beam width is 6°, a point target in space, such as an airplane, should be detected in at most three reports from the single unit 16. A valid target then will generate one of the following patterns of reports where X equals detection and 0 equals no detection: (X, 0, 0), (0, X, 0), (0, 0, X), (X, X, 0), (X, 0, X), (0, X, X), or (X, X, X). Radar processor 15 looks for one of the preceding patterns except the patterns (X, 0, 0), (0, X, 0) and (0, 0, X) which are sacrificed to improve rejection of the main beam clutter. Flight test data has shown that these patterns often occur for main beam clutter returns, whereas the other patterns containing at least two detection reports occur almost exclusively for valid targets only. Radar processor 15 performs the following correlation task:

(1) Look for the first detection followed by three reports with no detections at the same range ±60 meters.
(2) Look for one or more detections in the previous two reports prior to the first detection occurring at the same range ±60 meters.
(3) If step (2) is successful, look for no detections at the same range ±60 meters for five consecutive target reports starting with three reports back from the starting point in step (1).
(4) If step (3) is successful, stop the antenna, position it to the last detection position and command the radar to commence track lock sequence. If steps (2) and (3) are not successful, continue the antenna scan pattern. In other words, looking back at time of the target reports, there should be three intervals with no detections, followed by a pattern, such as provided above, followed by five consecutive reports with no detections as shown in Table I.

TABLE 1

| | | | | Report Number: | | | | | | | |
|---|---|---|---|---|---|---|---|---|---|---|---|
| | 1 | 2 | 3 | 4 | 5 | 6 | 7 | 8 | 9 | 10 | 11 |
| Patterns: 1. | 0 | 0 | 0 | 0 | 0 | 0 | 0 | X | 0 | 0 | 0 |
| 2. | 0 | 0 | 0 | 0 | 0 | 0 | X | X | 0 | 0 | 0 |
| 3. | 0 | 0 | 0 | 0 | 0 | X | 0 | X | 0 | 0 | 0 |
| 4. | 0 | 0 | 0 | 0 | 0 | X | X | X | 0 | 0 | 0 |

If a detection at a given range is rejected by the angle width discriminator, all detections at that range ±120 meters are rejected for the remainder of the antenna scan. This improves performance against fading altitude line returns, clutter and noise. The angle width discriminator or sliding window algorithm is a target finding scheme based on beam width discrimination, while at the same time, rejecting altitude line returns without interrupting the elevation acquisition scan of the antenna 12.

The altitude line detector algorithm or previous scan rejection algorithm performed by radar processor 15 utilizes data attained from the previous scan of antenna 12 to reject undesirable detections occurring in the present scan bar. It is based on the beam width discrimination criteria as follows. Undesirable detections are defined as those at any range number which have occurred five or more times during any scan bar. A scan bar is shown in FIG. 2 by lines 30 or 32. Radar processor 15 causes antenna 12 to scan at the rate of 120°/sec. The sample reporting rate from signal detection unit 16 for each integration period is 1 per 25 milliseconds, which precludes a valid target from being reported for more than three angular samples. Therefore (allowing a margin of safety) any range numbers reported five or more times in a given scan represent undesirable targets.

The lowest range number which is detected five or more times per scan bar is considered to be an altitude line return. All other range numbers which are detected five or more times per scan bar are considered to be undesired clutter returns. Every range number satisfying the "five or more" criteria is rejected during the next scan bar. The testing process occurs during the beam turnaround at the end of each scan bar. The results are available in time for use during the upcoming scan bar. New data is available for every scan bar after the first. The range rejection width is 300 meters. The lowest previous scan rejection range number (considered to be the altitude line) will be used to determine an optimum direction to sweep the radar system 14 range gate during the lock-on process for a valid target. The radar system 14 range gate will be swept from near range to far range except when the lowest previous scan rejection range value is less than the range value of the valid target. In this case, the radar system 14 range gate will be swept from far range to near range. Thus, the radar system 14 range gate will always sweep through the target first; before it can encounter the lowest previous scan rejection range, which is most likely the altitude line.

This invention is amenable to both hardware and computer software implementations. A computer program or software has been written for controlling radar processor 15 entitled, "Computer Controlled Automatic Acquisition". The software is written in the millicomputer assembly language, a description of which has been published by Westinghouse Electric Corporation. Targets are found by software by processing or comparing the range gate history buffer data with predetermined patterns. It is the object of this software to find real targets as opposed to altitude dependent returns, main beam clutter or noise. This is done by a twostep process: (1) sliding window search or angle width discrimination and (2) range blanking or altitude line detection.

Sliding window search or angle width discrimination is a method of comparing the eleven most recent samples, each sample being an integration and dump by signal detection unit 16, and determining whether the detection from three samples ago (if any) is a valid target. This method is capable of finding a target within 100 milliseconds of the time it was detected. Because each sample represents a different angle (25 milliseconds is about 3.0° at the 120° per sec. scan rate), this method is equivalent to angular discrimination. Angular discrimination is a definition of a target by the fact it can only span a small angle. The sliding window describes a target as a small group of hits (less than 7°) bracketed by misses before and after. The sliding window search is a five step procedure:

Step 1. Check the lowest range position at t3 (three samples back). If there is no valid range at that position, then continue the scan and wait for the next sample; otherwise, go to Step 2.

Step 2. Compare the range at t3 to all of the ranges from t0 (current), t1 and t2. If there are any values within 60 meters of t3, then return to Step 1 until each of the four possible range detections is checked; otherwise, go to Step 3.

Step 3. Compre the range at t3 to all of the ranges from t7, t8, t9 and t10. If there are any values within 60 meters of t3, then save the range value at t3 in the sliding window reject blanking range (to be described later) and return to Step 1 until each of the four possible range detections is checked; otherwise, go to Step 4.

Step 4. Compare the range at t3 to all the ranges at t6. If there are any values within 60 meters of t3, then set flag (used in Step 5) and go to Step 5.

Step 5. Compare the range at t3 to all of the ranges at t4 and t5. If there are any values within 60 meters of t3, then this range has passed all the sliding window criteria and may be a target. If there are no values near t3, then go back to Step 1 until each of the four possible range detections is checked.

After the target has pssed through the sliding window search successfully, it is compared to a table of seven blanking ranges. It if is not within 240 meters of any of these ranges, then it is a valid target and a target acquisition mode is initiated. These seven blanking ranges are:

1. SWR—Sliding Window Reject—from the sliding window target finding technique described above, any range that passes Steps (1) and (2), but fails Step (3). This range is blanked out for eight turnarounds (half scans). A maximum of three can exist at the same time.
2. PSR—Previous Scan Reject—any range (±120 meters) that appears five or more times during one half scan. This range is blanked out for twenty turnarounds (half scans).
3. PSR2—Secondary PSR—same as PSR but greater range. Blank out this range for five turnarounds (half scans).
4. PRRA—Automatic Previous Rejection Reject—after an attempted acquisition, if after holding full action on for its full duration (one second) and range lock is not on. Use the attempted acquisition range for blanking for the next three turnarounds (half scans).
5. PRRM—Manual Previous Rejection Reject—after a range skipover is initiated by pressing the nose wheel steering button while the radar is locked onto an acquired target. Use the range of the original target acquisition for blanking the next two turnarounds (half scans).

When a target is found, the software enters the target acquisition mode:

1. The predicted range voltage which corresponds to the detected target less 300 meters is sent to the radar via a D/A channel.
2. The position of the target in space is continually computed and sent to the antenna servo. This is done by using the antenna resolver input and inertial navigation unit 28 attitude inputs from when the target was detected and the current values of the inertial navigation unit 28 inputs to compute the current position of the target and antenna coordinates.
3. One hundred milliseconds after the target is detected, full action is set high and the predicted range analog output is set to 300 meters beyond the target. This results in a range sweep through the target.
4. The full action discrete output is held high for a total of 900 milliseconds. If the radar does not lock onto the target during this time, this range is inserted into the range blanking table as described above.

If the radar is locked on a target and the latched automatic acquisition input discrete is on and the nose wheel steering button is pressed, then range skipover is intiated:

1. While range lock is still high, the range input value is saved.
2. The radar range lock is broken by outputting the target reject output discrete for 100 milliseconds.
3. The antenna is held at its current position.
4. The current range values from the target detector are compared to the saved range value. If there is a detection which is at least 300 meters greater than this target and less than 5 miles, then the target acquisition sequence is initiated on target.
5. If there are no valid targets greater than this range, then resume the scan but do not start saving any detector data for about 115 milliseconds; this allows time for the antenna to get up to speed.

Figure 8:
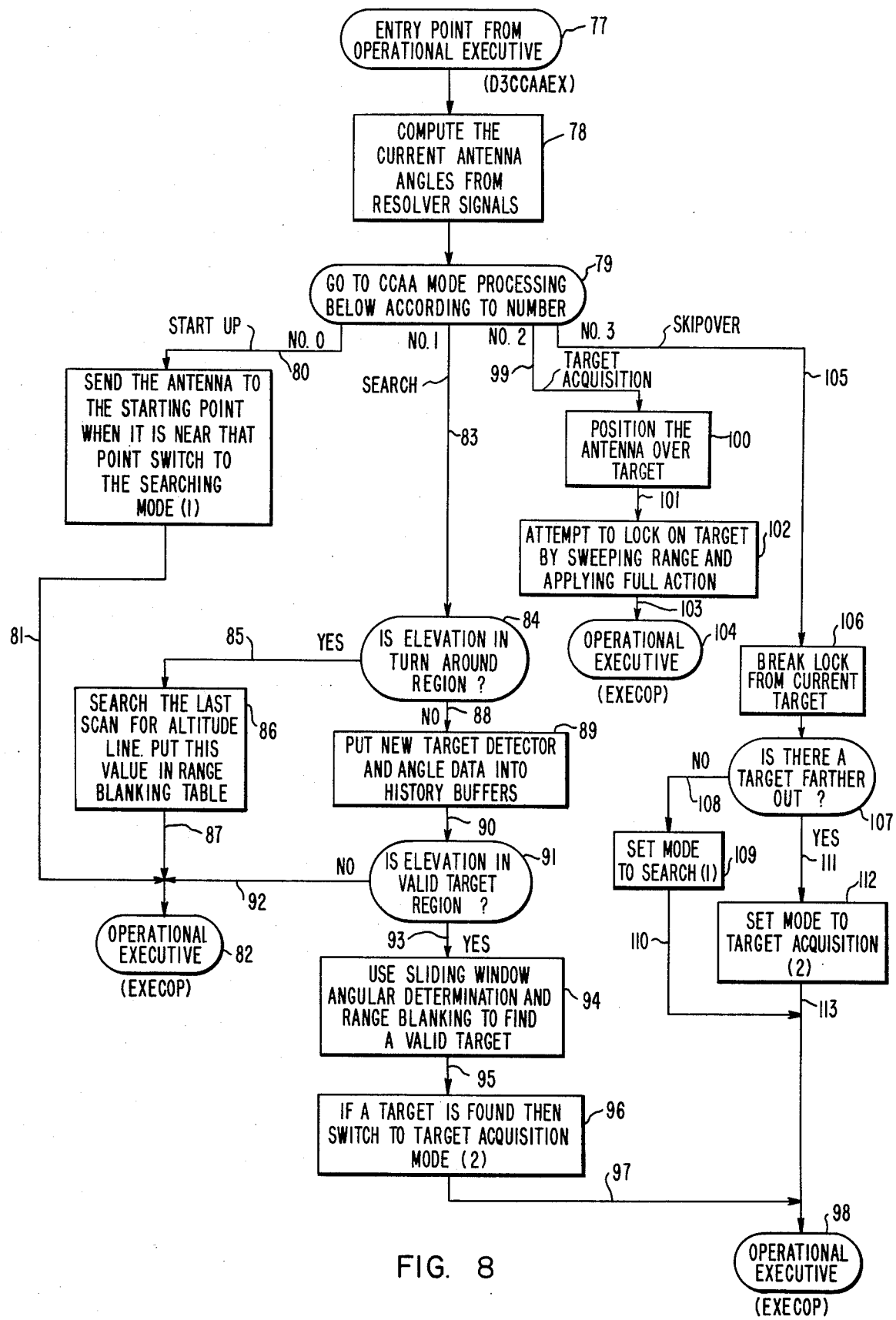
FIG. 8 shows a top level flow chart for the computer controlled automatic acquisition software.

FIG. 8 shows a top level flow chart for the computer controlled automatic acquisition software. At the top of FIG. 8 is entry point 77, from which point the radar processor 15 goes from the operational executive to the computer controlled automatic acquisition program. Radar processor 15 passes through entry point 77 periodically, for example, from 10 to 100 cycles per second. From entry point 77, radar processor 15 is programmed to compute the current antenna angles in degrees from the resolver signals which are expressed in sine and cosine voltage. The antenna angles are referenced to the airframe coordinate system. From box 78 radar processor 15 is directed to one of four paths, namely, Nos. 0 through 3, depending upon the number stored indicating the mode to be processed. If no number is stored, then No. 0 will be selected. Mode No. 0 on line 80 begins the start-up function by sending the antenna to the starting point of a scan. When it is near a starting point for the scan, the mode stored in mode processing box 79 is switched to No. 1. Radar processor 15 follows along line 81 to box 82, where it returns to the operational executive.

When radar processor 15 re-enters entry point 77, it computes the current antenna angles in degrees in box 78 and goes to box 79, where Mode No. 1 is stored and directs the programming path to follow along line 83, which is the search mode. Radar processor cycles through Mode No. 1 every 25 msec. At box 84, it asks the question, "Is the elevation of antenna 12 in the turn-around region?". If the answer is "yes", then path 85 is followed to box 86, wherein radar processor 15 searches the last scan for the altitude line and puts this value in the range blanking table. Radar processor 15 then follows path 87 to box 82 and returns to the operational executive.

The next time radar processor 15 enters entry point 77, it computes the antenna angles in box 78, since the mode is still in No. 1, it follows path 83 to box 84. If the answer to box 84 is "no", the program follows path 88 to box 89. At box 89, radar processor 15 puts the new target detector and angle data into history buffers. The target data comes from signal detection unit 16. Path 90 is followed to box 91, which asks the question, "Is the antenna elevation in the valid target region?". If no, then path 92 is followed, which returns radar processor 15 to the operational executive box 82. If the answer to box 91 is "yes", then radar processor 15 uses the sliding window angular determination and range blanking to find a valid target at box 94. Radar processor 15 then follows path 95 to box 96. If a target has been found from the processing in box 94, then switch to target acquisition mode No. 2 at box 79. Radar processor 15 follows path 97 to operational executive box 98, which returns processor 15 to the operational executive.

Radar processor 15 returns to entry point 77, computes the current antenna angles in box 78 and goes to mode No. 2 at 79. Mode No. 2 is the target acquisition mode and follows path 99 to box No. 100. At box No. 100, radar processor 15 positions the antenna over the target by sending proper angle information to radar system 14. Radar processor 15 follows path 101 to box 102, where radar processor 15 sends range information to radar system 14, which attempts to lock-on target by sweeping range and applying full action. Radar processor 15 follows path 103 to box 104, which returns radar processor 15 to the operational executive.

In the event that the target locked onto is undesired, such as a friendly aircraft, but with an enemy aircraft some distance beyond the friendly aircraft, mode No. 3 is used, which is set by a discrete signal sent by the radar observer. The next time radar processor 15 passes through boxes 77, 78 and 79 mode 3 is selected which is termed the skipover mode. Radar processor 15 follows path 105 to box 106 to break the radar lock on the current target. Radar processor 15 at box 107 asks the question, "Is there a targer further out?". If "no", path 108 is followed to set the mode to No. 1 at box 79, then follows path 110 to operational executive box 98 and returns to the operational executive. If box No. 107 is "yes", then path 111 is followed to box 112, which sets the mode in box 79 to No. 2 for target acquisition. Radar processor 15 then follows path 113 to operational executive 98. The operational executive noted by boxes 82, 104 and 98 are returning radar processor 15 to the operational executive so that radar processor 15 might perform other tasks under software control unrelated to computer controlled automatic acquisition.

A detailed description of the equations and algorithms to be solved by the computer controlled automatic acquisition (CCAA) software to implement the flow chart in FIG. 8 is as follows:

1 Auto-Acq Interrupt Processing. - Upon the occurence of a CCAA interrupt indicate that new data is ready by clearing the data ready flag.
D3INTPRC D3DATRDY = 0
Scan Processing. - Called from the interval timer interrupt executive at the 150 Hz rate.
D3CCAA
If Target reject = 0
Then
Decrement the do nothing counter by one but do not decrement to less than zero.
and
If scan flag = 1
and
If Scanning direction is up
and
If elevation is > 57°
Then
Reverse direction flag (down)
Azimuth ouput = +2°
Otherwise direction is down
If elevation is < −18°
Then
Reverse direction flag (up)
Azimuth output = −2°
Scan the antenna in elevation at 120°/sec:
$EL_n = EL_{n-1} (EL_{n-1} - EL_{n-2}) (.83333) + 0.13333$ (up)
$EL_n = EL_{n-1} + (EL_{n-1} - EL_{n-2}) (.83333) - 0.13333$ (down)
Otherwise (Target Reject = 1)
If CCAA mode = 3 (Skipover)
and -continued If Range Lock = 1
Then the target being tracked is being skipped.
Save the current range and angles for use by
normal Skipover processing.
Skipover Range = Range
EL$_{out}$ = Antenna Elevation
AZ$_{out}$ = Antenna Azimuth
Then
Use analog output processing to output:
Antenna Servo Elevation
Antenna Servo Azimuth
Target Acquisition Range (Predicted Range)
Return to the interrupt executive (E4SRCRTN)
directly from the output processing component.
3 Common Processing. - Common Processing is done in all
CCAA modes and is entered from the operational executive as
part of the search function.
D3CCAAEX
If Antenna Servo Command (Auto-Acq) = 0
then CCAA has not been selected
Return to operation executive (EXECOP)
If Antenna Servo Command = 1
then CCAA has been selected.
Compute the current antenna gimbal angles.
ELEV = ARCTN2 (sin $\lambda_e$, cos $\lambda_e$)
AZIM = ARCTN2 (sin $\lambda_a$, cos $\lambda_a$)
Go to CCAA mode processing:
   0 - Start-Up                          D3STRTUP
   1 - Target Find (Scanning)     D3SCNING
   2 - Target Acquisition           D3TGTACQ
   3 - Range Skipover             D3SKPOVR
4 Start-Up Mode. - When CCAA is first selected the mode control
component sets the CCAA mode to start-up. The routine is
entered from the CCAA common processing.
D3STRTUP
Stop scanning by setting scan flag to zero.
Scan Flag = 0
If |ELEV − (−21°)| >2° or |AZIM −0°| >2° (Not near start
position)
then send the antenna to start position.
EL$_{out}$ = −21°
AZ$_{out}$ = 0°
Return to operational executive (EXECOP)
Otherwise (Near start-up position)
EL$_n$ = EL$_{n-1}$ = −21° (Start scanning at −21° Elevation)
Direction = 0 (Start direction is up)
Clear Range Blanking Table
CCAA Mode = 1 (Target Find)
Scan Flag = 1 (Start scan)
Return to operational Executive (EXECOP)
5 Target Finding Mode. - This processing is entered from the
common processing when not start-up, acquisition or skipover.
D3SCNING
If EL < −18° or EL > −54° (in turn-around region)
and
IF AZ$_{out}$ ≠ 0 (not first scan)
and
If HISCLR = 1 (turn-around process already done)
then
Clear the range gate history buffer.
Return to operational executive (EXECOP)
Otherwise
Search the range gate history table for the
first 2 values which appear 5 or more times:
First occurance:
BLANK Range (1) = Range number
Scan counter (1) = 20
Second Occurance:
BLANK Range (2) = Range number
Scan counter (2) = 4
HISCLR = 1 (turn-around process done)
Decrement each end of scan counter by
one. Do not decrement to less than zero.
If a scan counter is zero clear the cor-
responding location in the memory table.
The memory table contains values which
must be saved for successive scans such
as range blanking values.
Return to the operational exec. (EXECOP)
Otherwise (in valid region or in buffer region)
If DATRDY = 0 then Data is ready, increment buffer index.
RBUF I = (RBUFI + 1) Modulo 22
RBUFAD = 4 (RBUFI)
Compute the maximum detector range as a function
of antenna elevation angle input:
ELEV > −3° MAXRNG = 30000 FEET
−3° > ELEV > −6° MAXRNG = 12000 FEET
−6° > ELEV > −9° MAXRNG = 8000 FEET
9° > ELEV > −12° MAXRNG = 6000 FEET
ELEV < −12° MAXRNG = 4500 FEET
Input the 2 target detector words (32 bits)
If Bits 1-8 of 1st word < MAXRNG
then get the first detection
RBUF (RBUFAD) = Bits 1-8
otherwise
RBUF (RBUFAD) = 0
If Bits 9-16 of 1st word < MAXRNG
then get the second detection
RBUF (RBUFAD + 1) = Bits 9-16
otherwise
RBUF (RBUFAD + 1) = 0
If Bits 1-8 of 2nd word < MAXRNG
then get the third detection
RBUF (RBUFAD + 2) = Bits 1-8
otherwise
RBUF (RBUFAD + 2) = 0
If Bits 9-16 of 2nd word < MAXRNG
then get the fourth detection
RBUF (RBUFAD + 3) = Bits 9-16
otherwise
RBUF (RBUFAD + 3) = 0
Set
DATRDY = 1 (data has been used)
Save antenna and aircraft attitude angles in the angle
history buffer.
ABUFI = (ABUFI + 1) Modulo 5 (Address)
ABUFAD = 12 (ABUFI)
ABUF (ABUFAD) = cos ($\lambda_e$)
ABUF (ABUFAD + 1) = sin ($\lambda_e$)
ABUF (ABUFAD + 2) = cos ($\lambda_a$)
ABUF (ABUFAD + 3) = sin ($\lambda_a$)
ABUF (ABUFAD + 4) = cos (2°)
ABUF (ABUFAD + 5) = sin (2°)
ABUF (ABUFAD + 6) = cos ($\phi$)
ABUF (ABUFAD + 7) = sin ($\phi$)
ABUF (ABUFAD + 8) = cos ($\theta$)
ABUF (ABUFAD + 9) = sin ($\theta$)
ABUF (ABUFAD + 10) = cos ($\psi$)
ABUF (ABUFAD + 11) = sin ($\psi$)
Now determine if the antenna is currently in the valid
detection area.
If AZ = 0 (1st scan)
and
If ELEV < −3°
then not in valid area (in start buffer region)
Return to operational executive (EXECOP)
or
If AZ ≠ 0 (not 1st scan)
and
If scanning up
and
If ELEV < 0° or EL > 54°
then not in valid area.
Return to EXECOP (buffer region)
or if scanning down
and
if ELEV < −18° or ELEV > 36°
then not in valid area.
Return to EXECOP (buffer region)
Otherwise
Begin the Target Finding Algorithms
Step 1 - Check for detection 3 samples ago
If RBUF (RBUFI-3) = 0 (no data 3 times ago)
then there is no data on which to base search
return to operational executive (EXECOP)
CHKRNG = RBUF (RBUFI - 3) (range number at T-3)
If all 4 values have been checked
then
return to operational executive (EXECOP)
Step 2 - Check for misses since.
Compare CHKRNG to the 12 values in the range gate history
buffer from samples T-0, T-1, and T-2.

-continued

If there are any ranges within 1 cell of CHKRNG
then
Return to step one to examine next T-3 detection
Step 3 - Check for misses before.
Compare CHKRNG to the 16 values in the range gate history
buffer from samples T-7, T-8, T-9, and T-10.
If there are any ranges within 1 of CHKRNG
then
store CHKRNG into the range blanking table and
set the corresponding scan counter to 8 and return
to step 1.
Step 4 - Check for a target that spans 4 samples.
Compare CHKRNG to the 4 values in the range gate history
buffer from the T-6 sample.
If there are any range within 1 cell of CHKRNG
then
set 4 HIT FLAG = 1
otherwise
set 4 HIT FLAG = 0
Step 5 - Check the target group size and shape.
Compare CHKRNG to the 8 values in the range gate history
buffer from the T-4 and T-5 samples.
If there are not ranges within 1 of CHKRNG
and
If 4 HIT FLAG = 1
then
Store CHKRNG into the range blanking table
and set the corresponding scan counter to
eight and return to step 1.
otherwise
return to Step 1 to examine next T-3 detection
If there is only one range within 1 cell of CHKRNG then
this is an abnormal sized target.
Go to step 6
otherwise there are 2 ranges within 1 cell of CHKRNG
If 4 HIT FLAG = 1
then this is an abnormally large target.
Go to step 6.
otherwise this is a normal target.
Go to step 7.
Step 6 - The target has an abnormal size - check previous
scans data for similar targets.
If CHKRNG is within 5 cells of any value in the 4 HIT -
2 HIT table then this is a possible target.
Go to step 7
otherwise
Insert CHKRNG into the 4 HIT - 2 HIT table for future
scans. Initialize the scan counter to 8. Return to
step 1.
Step 7 - Check to see if this range is blanked.
If there is any range in the range blanking table which is
within 5 cells of CHKRNG
then
Return to Step 1 to examine the next T-3 detection.
otherwise
Initilize the target acquisition mode:
Convert range number to feet scaled 18
RNG = CHKRNG * 200 feet
Set predicted range
TGARNG = RNG - 600 feet
Full action clock = clock
CCAA Mode = 2
Scan Flag = 0 (stop scanning)
Target Acquisition Mode. - This routine is entered from the
common processing whenever a target was found by the target
finding algorithms or a new target is found upon a range skipover.
D3TGTALQ
Position the antenna over the position where the target was
at the T-4 sample.
Compute the Line-of-sight unit vector at T-4 in radar
boresight coordinates.

$$\begin{pmatrix} A_0 \\ A_1 \\ A_2 \end{pmatrix} = \begin{pmatrix} LOS_{io} \\ LOS_{jo} \\ LOS_{ko} \end{pmatrix}$$
$$= (-2)(\phi_{To})(\theta_{To})(\psi_{To})(\psi_{T-4})^{-1}(\theta_{T-4})^{-1}(\phi_{T-4})^{-1}(-2)^{-1}$$

$$(\lambda_{aT-4})^{-1}(\lambda_{eT-4})^{-1}\begin{pmatrix} 1 \\ 0 \\ 0 \end{pmatrix}$$

where
$\lambda_{eT-4}$ is the antenna elevation from four samples ago
$\lambda_{aT-4}$ is the antenna azimuth from four samples ago
$-2$ is the antenna elevation boresight angle
$\phi_{T-4}$ is the A/C roll from four samples ago
$\theta_{T-4}$ is the A/C pitch from four samples ago
$\psi_{T-4}$ is the A/C heading from four samples ago
$\phi_{To}$ is the current A/C roll angle
$\theta_{To}$ is the current A/C pitch angle
$\psi_{To}$ is the current A/C heading angle
then since $$\begin{pmatrix} A_0 \\ A_1 \\ A_2 \end{pmatrix} = \begin{pmatrix} LOS_{io} \\ LOS_{jo} \\ LOS_{ko} \end{pmatrix} = \begin{pmatrix} \cos EL \cos AZ \\ \cos EL \sin AZ \\ -\sin EL \end{pmatrix}$$

normalize A0, A1

$$\begin{pmatrix} A_0 \\ A_1 \end{pmatrix} = \frac{\begin{pmatrix} LOS_{io} \\ LOS_j \end{pmatrix}}{\left| \begin{matrix} LOS_{io} \\ LOS_{jo} \end{matrix} \right|} = \begin{pmatrix} \cos AZ \\ \sin AZ \end{pmatrix}$$

and $$\cos EL = \left| \begin{matrix} LOS_{io} \\ LOS_{jo} \end{matrix} \right|$$

compute angles
EL = ARCTAN (sin (EL)/cos (EL))
AZ = ARCTAN (sin (AZ)/cos (AZ))
If the (clock-full action clock) < 100 msecs
then wait 100 msecs
return to operational executive. (EXECOP)
otherwise hold full action for 800 msecs.
If (clock-full action clock) < 900 msecs
then
Full Action = 1
TGARNG = TGARNG + 2000 feet
return to operational executive (100 msecs has
elapsed)
otherwise
Save the range gate number for this target in the range
blanking table and set the corresponding scan counter
to 3.
AZ = 0° (commanded)
Do nothing count = 17
CCAA mode = 1 (target find)
Init scan to current elevation:
$EL_s$ = ELEV
$EL_{n-1}$ = ELEV
Scan flag = 1 (start scanning)
Return to the operational executive. (EXECOP)
7 Range Skipover Mode. - This routine is entered from the common
processing whenever a target is being rejected using the
CCAA skipover.
D3SKPOVR
Stop the antenna scan:
SCAN FLAG = 0
Convert the range of the target being skipped to a range
gate number:
CHKRNG = Skipover Range/200
where the skipover range was saved in the scan processing
routine while a range lock was still present.
If DATRDY = 1 (not ready)
then
return to operational executive (EXECOP)
otherwise
data is ready for input
compare the CHKRNG to the 4 range gate numbers
from the target detector sample.
If there are any ranges greater than CHKRNG -continued then acquire the next greater range:
CCAA Mode = 2 (target acquisition)
Do target acquisition initialization as
decribed in paragraph 3.2.6.1.1.6
Go to target acquisition processing.
otherwise
there are no more range values greater than CHKRNG
then put the value of the past target acquired in the
range blanking table and set the corresponding scan
counter to 2.
AZ = 0° (commanded)
Do nothing counter = 17
Init the scan to current elevation:
$EL_s$ = ELEV
$EL_{n-1}$ = ELEV
Scan flag = 1 (start scanning)
Return to the operation executive. (EXECOP)

Figure 9:
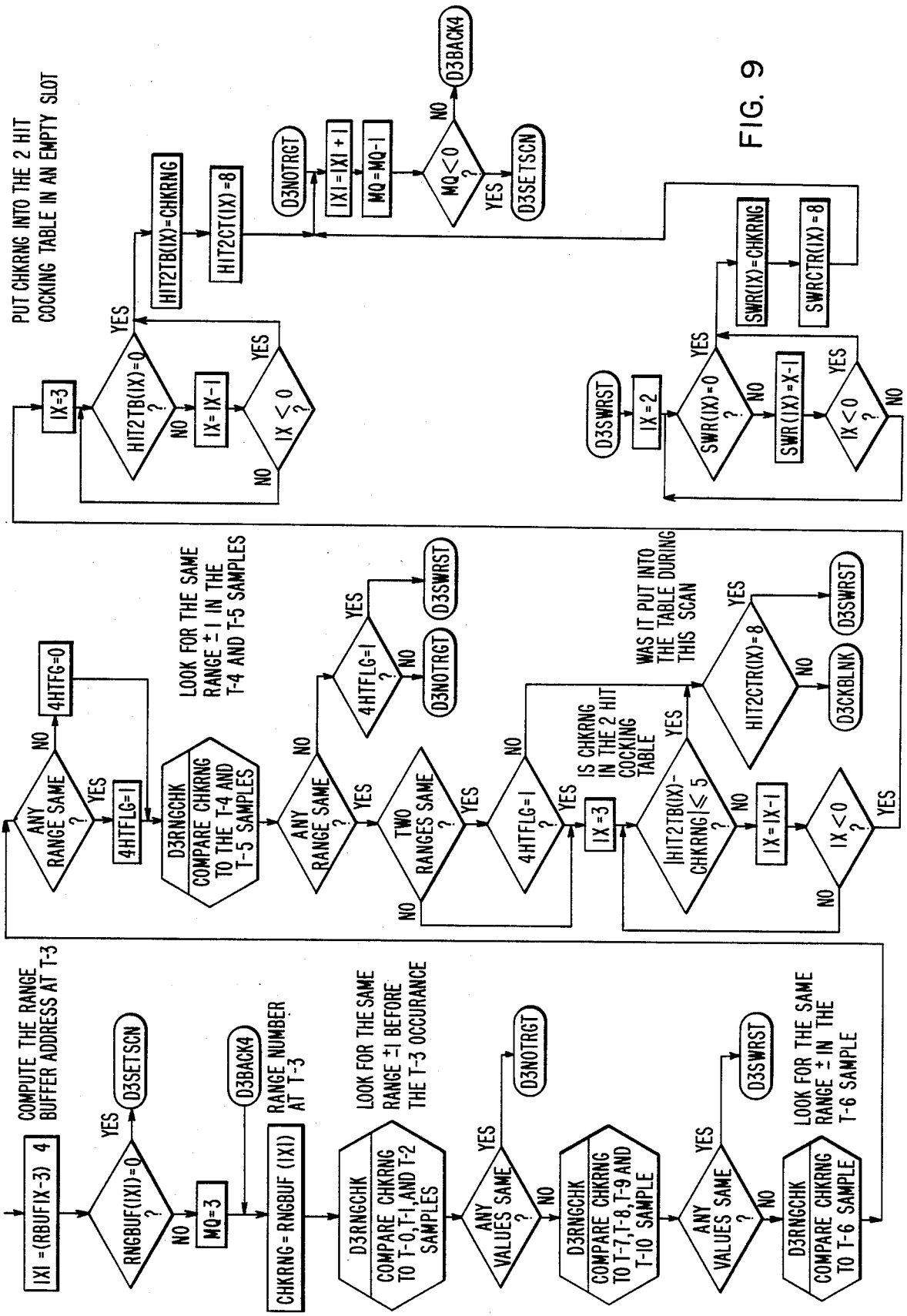
FIG. 9 shows a detail flow chart for the computer controlled automatic acquisition software of box 94 in FIG. 8.

FIG. 9 shows a detailed flow chart for the computer controlled automatic acquisition software for implementing box 94 of FIG. 8. In FIG. 9 the box designated with the letters "D3SETSCN" directs radar processor 15 back to the operational executive. The box designated with the letters "D3SWRST" directs radar processor 15 to perform range blanking.

The invention provides a method for operating a pulse radar for acquiring a target comprising the steps of transmitting a sequence of signals from an antenna, said antenna radiating most of the electromagnetic energy in a narrow beam having a predetermined beam width; scanning the antenna to direct the beam along a predetermined path represented by a plurality of path increments connected in series; receiving reflected signals emanating from the antenna; integrating a plurality of the reflected signals arriving at the antenna at a predetermined time interval corresponding to a range cell and path increment for the directed beam to provide an output signal; thresholding the output signal to provide a target report at times when the amplitude of the output signal is greater than a predetermined value; repeating the steps of receiving and thresholding for a plurality of time intervals for each of a plurality of path increments for the directed beam; storing the target reports comparing the occurrence of the target reports as a function of the plurality of path increments and range cell locations; and selecting target reports indicative of a target having a valid target size.

Reference is made to a computer program listing attached hereto as Appendix 1, pages 1 through 31, to provide a detailed understanding of the software that may be utilized to practice one embodiment of the present invention.

Although not considered essential, attention is directed to a description of the listing language of Appendix 1 which is entitled "Computer Programming Manual For Operational Flight Program" and published in April, 1978 by Westinghouse Electric Corporation in Volumes I and II, and identified as Contract Data Requirement list A00M, on Air Force Contract No F42600-76-C-0236 and available from the Defense Documentation Center, Cameron Station, Alexandria, Va 22314.

```
. *************************** BLK 6 ******************************
.
.         DIGITAL AUTOMATIC ACQUISITION SCRATCH BLOCK
.
.
$(D3SCBLK)
BK6LOC0    0
           1
           2
           3
           4
           5
           6
           7
           8
           9
           1C
           040000
           077777
           0177777
           0100001
           0100000
           0140000
           040001
           30
           +EXIT
           31
           +D3SCBLK*/8
           +(UTB-D3SCBLK)*/8
           +N9VECT+(D3SCBLK-BLOCK1)*/8
.
.
.   COMPUTER CONTROLLED AUTO-ACQ CONSTANTS
.
D3MODTBL            +D3STRTUP       . CCAA JUMP TABLE
                    +D3SCNING
                    +D3TGTACQ
                    +D3SKPOVR       . ADDRESS OF SKIPOVER MODE PROCESSING
D3SCANAD            +D3SETSCN       . ADDRESS OF SCAN FLAG SET CODE
D3TAINAD            +D3TGACIN       . ADDRESS OF TARGET ACQUISITION INITIALIZATIO
D3ATMPBF            +D3TMPBUF-D3SCBLK*/8      . ADDRESS OF BUFFER
D3ARNGBF            +D3RNGBUF+(D3BUFBLK-D3SCBLK)*/8   . RELATIVE ADDR OF RNG BU
D3ACSPSI            +F2CPSI         . ADDRESS OF ANGLE DATA IN FILTER BLOCK
D3INTRTN            +E4SRCRTN       . RETURN TO INTERRUPT EXECUTIVE
D3TOLER    EQU      ONE             . RANGE GATE TOLERANCE
D3ELEVEN            11
D3DONTHI            17              . DO NOTHING INIT
D3NSCBLK            -(D3SCBLK)*/8   . NEGATIVE OF SCRATCH BLOCK  (ADDRESS D?A)
D3FLBLKD            (BLOCK5-D3SCBLK)*/8       . OFFSET TO FILTER BLOCK
D3IOBLKD            (I2SCRTCH-D3SCBLK)*/8     . OFFSET TO I/O SCRATCH BLOCK
D3RNGMSF            0.1953125       . [(2DGFT/QUANTA)/(2**18)]*[(2**15)/(1*2**7)]
```

```
D3REVMSF                0.04                    . CONVERT BACK TO RNG GATE (1/((2**7)(0.1953))
D3MNTGAR                1000.0*/-18             . MINIMUM ALLOWABLE TARGET ACQ RANGE OUTPUT
D3PRESWP                600.0*/-18              . PREDICTED RANGE SWEEP FIRST POSITION
D3C1KFT      EQU        D3MNTGAR                . USED TO COMPARE RANGE INPUT TO PRED RNG OUTP
D3RNGTOL     EQU        5                       . FOR RANGE SKIP OVER GAP (ABOUT 1000 FT)
D3ANTPTR                +I2ANT-I2AOCT           . OUTPUT TABLE POINTER OFFSET
D3ANTCT      EQU        D3ANTPTR                . I2ANT-I2AOCT
D3NUMANG     EQU        5                       . NUMBER OF PAST ANGLE SETS SAVED
D3PSRCI                 20                      . PSR HALF SCAN COUNTER INIT
D3PSRHCI                4                       . PSR HIGH VALUES HALF SCAN COUNTER INIT
D3SWRCI                 8                       . SLIDING WINDOW REJECT HALF SCAN COUNTER INIT
D3ARJCI                 3                       . AUTO REJECT HALF SCAN COUNTER INIT
D3MRJCI                 2                       . MANUAL REJECT HALF SCAN COUNTER INIT
D32H4HCI                8                       . 2 HIT AND 4HIT COCKING 1/2 SCAN COUNTER INIT
D3BUFBAD                +(D3BUFBLK-D3SCBLK)*/8  . OFFSET TO BUFFER BLOCK
D3P3DEG                 3.0/180.0               . 3 DEGREES
D3MXRTAB     (4500.0/200.0)*/-15                .       EL<-12DEGREES
             (6500.0/200.0)*/-15                . -9DEG>EL>-12DEGREES
             (8500.0/200.0)*/-15                . -6DEG>EL>-9DEGREES
             (12000.0/200.0)*/-15               . -3DEG>EL>6DEGREES
             (30000.0/200.0)*/-15               .      EL>-3DEGREES
D3OUTCOD                000165                  . OUTPUT TO CCAA BOX
D3DATADR                +D3SRLDT1-1             . ADDRESS OF SERIAL INPUT BUFFER
D3READBT     EQU        BASTRD                  . BIT 16 = READ BIT
D3CAASTA                054000                  . STATION CODE FOR CCAA
D3CAAOAD                +D3OUTCOD               . ADDRESS OF OUTPUT TO CCAA BOX
D3WAITCT                40                      . MAXIMUM I/O WAIT = ABOUT 100 USECS
.
. THE SCAN .......
.
.            THE SCAN IS DIVIDED INTO 5 SECTIONS -
.
.            1. THE UPPER TURN-AROUND REGION - THE ANTENNA IS SLOWING DOWN
.               AND SPEEDING UP - NO DETECTOR DATA IS SAVED AND THE RANGE GATE
.               HISTORY BUFFER IS CLEARED.
.            2. THE UPPER BUFFER REGION - DETECTOR DATA IS SAVED IN THE
.               HISTORY BUFFER BUT ACQUISITIONS ARE NOT ALLOWED BECAUSE
.               SUFFICIENT HISTORY IS NOT BUILT UP.
.            3. THE VALID REGION - DETECTOR DATA IS SAVED AND TARGET ACQUISI-
.               TIONS ARE ALLOWED.
.            4. THE LOWER BUFFER REGION - SAME AS 2.
.            5. THE LOWER TURN-AROUND REGION - SAME AS 1.
.
. THE FOLLOWING PARAMETERS DEFINE THE SPEED AND LIMITS OF THE SCAN DESCRIBED
.
D3IFRQ       EQU        150.0                   . HZ    INTERVAL INTERRUPT TIMER FREQUENCY
D3AFRQ       EQU        40.0                    . HZ    AUTO-ACQ INTERRUPT FREQUENCY
D3SPD        EQU        120.0                   . DEG/SEC SCAN SPEED
D3UPL        EQU        57.0                    . DEGREES UPPER SCAN LIMIT
D3LOL        EQU        -21.0                   . DEGREES LOWER SCAN LIMIT
D3SINC       EQU        D3SPD/D3AFRQ            . DEGREES AMOUNT OF SCAN BETWEEN AA INTERUPTS
.
D3LIMIT      +D3UPL/180.0                       . HIGHEST SCAN ANGLE
D3STRTPS     +D3LOL/180.0                       . LOWEST SCAN ANGLE
D3PODEG                 0.0/180.0               . STARTING POSITION AZIMUTH
D3RHO        +(D3SPD/180.0)*(25.0/(D3IFRQ*D3IFRQ))
             -(D3SPD/180.0)*(25.0/(D3IFRQ*D3IFRQ))
D3C          1.0-25.0/D3IFRQ                    . SCAN RATE CONSTANT
D3LOLIM      +(D3LOL+(4*D3SINC))/180.0          . LOWEST VALID REGION ANGLE
D3UPMLO      +(D3UPL-D3LOL-8*D3SINC)/180.0      . HIGHEST - LOWEST VALID REGION ANGLE
D3LOBFLM     +(D3LOL+D3SINC)/180.0              . LOWEST BUFFER REGION ANGLE
D3UMLBLM     +(D3UPL-D3LOL-2*D3SINC)/180.0      . HIGHEST - LOWEST BUFFER REGION ANGLE
D3NUMRNG     +((D3UPL-D3LOL-4*D3SINC)/D3SINC)*/-15  . NO. OF RNG GTE SAVD
.
D3AJANG      -(D3SINC*3)/180.0                  . ANGLE USED TO RECTANGULARIZE VALID REGI
D3AZBAR                 -2.0/180.0              . AZIMUTH GOING UP      2 BAR SCAN
D3P2DEG                 2.0/180.0               . AZIMUTH GO DOWN       2 BAR SCAN
.
. CCAA BUILT IN TEST CONSTANTS
.
D3T100MS     EQU        M5T100MS                . 100 MS
D3T800MS     EQU        M5T800MS                . 800 MSECS
D3B2OUTP                +I2LRI-I2AOCT           . OUTPUT TABLE POINTER
D3B2OUTC     EQU        D3B2OUTP                . NUMBER OF OUTPUTS - 1
D3B2BLKD     EQU        D3IOBLKD                . OFFSET TO BIT SCRATCH BLOCK
.
. TIRS TRANSFER CONSTANTS
.
T8TRADAD                +T8TRSADR               . ADDRESS OF TIRS ADDRESS
T8OUTAWD                000401                  . ADDRESS OUTPUT CONTROL WORD
T8MAXTIM                37                      . FOR MAX I/O READY LOOP
T8TRDTAD                +T8DATA                 . ADDRESS OF DATA TO BE TRANSFERRED
T8OUTDWD                002001                  . DATA OUTPUT CONTROL WORD
T8FILLPT                0125252                 . BIT PATTERN FOR FILLING UNUSED LOCATIONS
T8MAXADR                511                     . HIGHEST TIRS BOX ADDRESS
T8WAITCT                775                     . DOUBLE WAIT LOOP
T8OUTMWD                004000                  . MEMORY FULL INDICATOR OUTPUT CONTROL WORD
T8SNAPST                +S2BEGIN-T8SCBLK*/8     . START OF SNAPSHOT MEMORY
BLK6END      EQU        $-1
.
. COMPUTER CONTROLLED AUTO-ACQ INPUTS
.
.
. INPUTS TO CCAA BUILT IN TEST
.
D3DAANWS     EQU        M5DAANWS                . AUTO ACQ BUTTON
D3RNGLCK     EQU        M5RNGLCK                . RANGE LOCK DOSCRETE
.
. COMPUTER CONTROLLED AUTO-ACQ OUTPUTS
```

```
D3EL        RES             1               . DEG/180  SOURCE OF ANTENNA SERVO ELEVATION
D3AZ        RES             1               : DEG/180  SOURCE OF ANTENNA SERVO AZIMUTH
D3TGARNG    RES             1               . FEET SCLD 18, SOURCE OF TRGT ACQ RNG OUTPUT
.
. COMPUTER CONTROLLED AUTO-ACQ INTERMEDIATES
.
D3SAVIX1    RES             1               . TEMPORARY INDEX SAVE
D3SAVIX2    RES             1               . TEMPORARY INDEX SAVE
D3ELEV      RES             1               . DEG/180, INTERMED, CURRENT ANTENNA ELEVATION
D3AZIM      RES             1               . DEG/180, INTERMED, CURRENT ANTENNA AZIMUTH
D3RBUFIX    RES             1               . RANGE GATE HISTORY BUFFER POINTER  (0 TO 8)
D3ABUFIX    RES             1               . ANGLE HISTORY BUFFER POINTER       (0 TO 3)
D3MAXRNG    RES             1               . MAXIMUM USABLE DETECTOR RANGE    RNG GATE NUM

D3MEMTBL    RES             11              . TABLE OF VALUES SAVED FROMM PREVIOUS SCANS
D3MOSTLK    EQU             D3MEMTBL        . SECONDARY PSR NUMBER
D3PSR       EQU             D3MOSTLK+1      . PRIMARY PSR NUMBER        (RANGE/200 FEET)
D3SWR1      EQU             D3PSR+1         . SLIDING WINDOW REJECT
D3SWR2      EQU             D3SWR1+1
D3SWR3      EQU             D3SWR2+1
D3PRRM      EQU             D3SWR3+1        . PREVIOUS REJECT REJECT MANUAL   (SKIPOVER)
D3PRRA      EQU             D3PRRM+1        . PREVIOUS REJECT REJECT AUTOMATIC (SYNC REJEC
D3HIT2TB    EQU             D3PRRA+1        . TABLE OF TWO AND FOUR HIT CANDIDATES  (4LOC)

D3MEMCTR    RES             11              . HALF SCAN COUNTERS
D3PSRHCT    EQU             D3MEMCTR        . COUNTER FOR HIGHER PSR NUMBERS
D3PSRCTR    EQU             D3PSRHCT+1      . MAIN PSR REJECT COUNTER
D3SWR1CT    EQU             D3PSRCTR+1      . SLIDING WINDOW REJECT COUNTER
D3SWR2CT    EQU             D3SWR1CT+1
D3SWR3CT    EQU             D3SWR2CT+1
D3PRMCTR    EQU             D3SWR3CT+1      . PRR MANUAL COUNTER
D3PRACTR    EQU             D3PRMCTR+1      . PRR AUTOMATIC COUNTER
D3HIT2CT    EQU             D3PRACTR+1      . 2 HIT CANDIDATE COUNTERS  ( 4 LOCATIONS )

D3HISCLR    RES             1               . RANGE GATE HISTORY BUFFER CLEAR FLAG
D3LASTGT    RES             1               . RANGE GATE NUMBER FROM LAST POSSIBLE TARGET
D3CHKRNG    RES             1               . CONTAINS THE 8 BIT RANGE GATE NUMBER TO CHK
D3RNGLIM    RES             1               . UPPER LIMIT OF RANGE SWEEP    FT S 18
D3DIR       RES             1               . ANTENNA SCAN DIRECTION 0-POSITIVE, 1-NEGATIV
D3ELS       RES             1               . CURRENT ELEVATION SCAN POSITION  DEG/180
D3OEL       RES             1               . ANTENNA ELEVATION , LAST CYCLE
D3RNG       RES             1               . RADAR RANGE INPUT FEET SCLD 16 OR 18
D3SCMODE    RES             1               o SCALE MODE 0-LRI,BIT  1-CCM,VI,ACM,SRCH
D3DONTHC    RES             1               . DO NOTHING DOWN COUNTER - WHILE SCANNING
                                            . DO NOT LOOK FOR ANY TARGET WHEN THIS IS > 0
D3SCNFLG    RES             1               . SCAN FLAG --- SCANNING WHEN THIS = 0
D3TEMP      RES             1               . SCRATCH
D3TMPBUF    RES             4               . SCRATCH
D3TEMP1     EQU             D3TMPBUF
D3TEMP2     EQU             D3TMPBUF+1
D3HIT4FL    RES             1               . = -1 IF GOT HIT AT T-6 , 0 IF NOT
D3ANGBUF    EQU             0               . ANTENNA AND INERTIAL ANGLE HISTORY BUFFER
D3RNGBUF    EQU             D3NUMANG*12+D3ANGBUF   . RANGE GATE HISTORY BUFFER
.
. CCAA BUILT IN TEST INTERMEDIATES
.
D30AANWS    EQU             M50AANWS        . CCAA BUTTON FROM PREVIOUS CYCLE
.
. TIRS TRANSFER INPUTS
.
T8TAILNM    EQU             TAILNUM         . TAIL NUMBER
.
. TIRS TRANSFER INTERMEDIATES
.
T8SNPADR    RES             1               . SNAPSHOT MEMORY ADDRESS
T8DATA      RES             1               . DATA TO BE OUTPUT
T8TRSADR    RES             1               . TIRS ADDRESS
$(D3PROG1)
.
. *************** D3CCAA *************************************************
.
.
.  PURPOSE: WHILE IN SEARCH DIGITAL AUTO-ACQ MODE - ASSIST THE RADAR IN
.           ACQUIRING THE TARGET BY:
.              1. IGNORING THE ALTITUDE LINE
.              2. BY SENDING RANGING INFORMATION BACK TO THE RADAR
.
. ---------------------------------------------------------------------
D3CCAAEX . COMPUTER CONTROLED AUTOMATIC ACQUISITION
.
            LD              IX,D3IOBLKD     . OFFSET TO THE I/O SCRATCH BLOCK
            LD,             A0,I2CAACMD     . IS DIGITAL AUTO-ACQ ON ?
            TNZ             A0
            LDA             IC,(EXECOP)     . NO, RETURN TO EXEC
.
. COMPUTE AND STORE THE CURRENT RADAR ANTENNA ANGLES
.
            LD              IX,TWO
D3BACK1     ST              IX,D3SAVIX1
            A               IX,D3FLBLKD     . OFFSET TO FILTER SCRATCH BLOCK
            LD,             A0,F2CLAMDE     . COSINE
            LD,             A1,F2SLAMDE     . SINE
            JS              ARCTN2          . UPON RETURN: A0=DEG/180
```

```
              LD        IX,D3SAVIX1
              SRL       IX,1
              ST,       A0,D3ELEV         . SAVE THIS ANGLE
              JC        IX,S-D3BACK1      . GO BACK FOR ELEVATION ANGLE
;
; JUMP TO PROCESSING ACCORDING TO THE CURRENT CCAA MODE NUMBER
;
              LDA       IX,D3CAAMOD
              LD,       IC,D3MODTBL
                        D3STRTUP          . CCAA MODE = 0 ; START-UP
                        D3SCNING          . CCAA MODE = 1 ; SCANNING
                        D3TGTACQ          . CCAA MODE = 2 ; TARGET ACQUISITION
                        D3SKPOVR          . CCAA MODE = 3 ; RANGE SKIP OVER
;-----------------------------------------------------------------------
; START-UP MODE *IF THE ANTENNA IS NOT WITHIN 2 DEGREES OF STARTING POINT
;              *.   THEN: SEND THE ANTENNA TO STARTING POSITION
;              *.   ELSE: SWITCH CCAA MODE TO SCANNING  (=1)
;-----------------------------------------------------------------------
D3STRTUP  LD            A0,ZERO           . CLEAR THE SCAN FLAG -- STOP THE EL SCAN
          ST            A0,D3SCNFLG
          LD            IX,ONE
D3BACK2   LD,           A0,D3ELEV         . CURRENT ANTENNA ANGLE
          S,            A0,D3STRTPS       . IS THE ANGLE WITHIN 2 DEG OF STARTING POS
          TGEZ          A0                . FIND ABSOLUTE VALUE
          N             A0,NEG1
          S             A0,D3P2DEG        . WITHIN 2 DEGREES ?
          TLZ           A0
          J             D3JUMPST          . NO, JUMP THE ANTENNA TO START POINT
          JC            IX,S-D3BACK2
          LD            A0,ONE            . BOTH ANGLES ARE CLOSE TO POINT, SWITCH MODE
          STA           A0,D3CAAMOD
          LD            A0,D3EL           . INITIALIZE THE SCAN
          ST            A0,D3OEL
          ST            A0,D3ELS
          LD            A0,ZERO           . SCAN UP FIRST
          LD            IX,SIX            . 7 ITEMS
          ST,           A0,D3MOSTLK       . CLEAR ALL BLANKING RANGES
          JC            IX,1
          ST            A0,D3DIR
          LD            IC,D3SCANAD       . GO START THE SCAN
D3JUMPST  LD            A0,D3STRTPS       . EL = STARTING ELEVATION
          ST            A0,D3EL
          LD            A0,D3P0DEG        . AZ = 0 DEG
          ST            A0,D3AZ
          LD            A0,D3MNTGAR       . INITIALIZE PREDICTED RANGE TO MINIMUM
          ST            A0,D3TGARNG
          LDA           IC,(EXECOP)       . RETURN TO EXEC
$(D3PROG2)
;
;-----------------------------------------------------------------------
D3SCNING  LD            A0,D3ELEV         . CURRENT ELEVATION ANGLE INPUT
          S             A0,D3LOLIM        . IS ELEVATION > LOWER LIMIT ?
          TGEZ          A0
          J             D3TRNARD          . NO
          S             A0,D3UPMLO        . IS THE ELEVATION ; UPPER LIMIT ?
          TLEZ          A0
          J             D3TRNARD          . NO

LD            A0,D3DONTHC       . ARE WE WAITING FOR THE ANTENNA TO MOVE 10 DG
          TNZ           A0
          J             D3INRGN           . NO, THE DOWN COUNTER =0 - GO LOOK FOR TGT
D3OUTRGN  LD            IX,D3NUMRNG       . CLEAR THE RANGE GATE HISTORY BUFFER
          SLL           IX,2              . X 4
          S             IX,ONE            . BECAUSE JC
          LD            A0,ZERO
          A             IX,D3BUFBAD       . OFFSET TO BUFFER BLOCK
          ST,           A0,D3RNGBUF
          S             IX,D3BUFBAD       . RESET INDEX
          JC            IX,3
          ST            A0,D3RBUFIX       . INIT THE HISTORY BUFFER POINTER
          LD            IC,D3SCANAD       . CONTINUE THE SCAN
;
; IN THE ANTENNA TURN-AROUND REGION
D3TRNARD  LD            A0,D3HISCLR       . HISTORY CLEAR FLAG 1-CLEAR  0-DO NOT CLEAR
          TEZ           A0
          J             D3OUTRGN          . GO CLEAR THE HISTORY BUFFER
          LD            A0,D3AZ           . COMMANDED AZ IS ZERO ON FIRST SCAN AND
                                          . AFTER RESUMING SCAN -- DON'T DO SEARCH
          TNZ           A0                . ACQ OR SKIPOVER
          J             D3SETCLR          . THEN DO NOT DO THE MOST LIKELY SEARCH
;
; FIND THE MOST LIKELY ALTITUDE LINES BY SEARCHING THE PREVIOUS SCAN
; FOR ANY RANGE GATE THAT APPEARS FIVE OR MORE TIMES
;
          LD            A0,ONE            . INITIALIZE THE MOST LIKELY POINTER (2 PSR'S)
          ST            A0,D3SAVIX2
          LD            A2,ZERO           . USED TO CLEAR THE RANGE GATE HISTORY BUFFER
          LD            IX,D3NUMRNG       . NUMBER OF 4-GATE SAMPLES   (EVERY 25 MSEC)
          SLL           IX,2              . X4
          S             IX,ONE            . BECAUSE OF JC
D3BACK8O  ST            IX,D3SAVIX1
          A             IX,D3BUFBAD       . OFFSET TO BUFFER BLOCK
          LD,           A0,D3RNGBUF       . GET THE RANGE GATE NUMBER FROM BUFFER
```

```
           TGZ      A0                  . IS IT ZERO?
           J        D3NXTCHK            . YES, CHECK NEXT
           ST       A0,D3TEMP           . SAVE FOR CHECK
           ST,      A2,D3RNGBUF         . CLEAR THIS POSITION IN BUFFER

LD       IX,D3SAVIX1         . SEARCH THE REST OF THE TABLE FOR CLOSE RNGS
           S        IX,ONE              . SKIP THE ONE ITS ON
           LD       A1,ZERO             . INITIALIZE THE COUNTER
           TGZ      IX
           J        D3NXTCHK
D3BACK90   A        IX,D3BUFBAD         . OFFSET TO BUFFER BLOCK
           LD,      A0,D3RNGBUF         . GET THE RANGE GATE NUMBER FROM TABLE
           TGZ      A0                  . IS IT ZERO ?
           J        D3NXTGTE            . YES, CHECK NEXT
           S        A0,D3TEMP           . SUBTRACT THE VALUE BEING CHECKED
           TLZ      A0                  . DIFFERENCE NEGATIVE ?
           J        S+3                 . NO.
           N        A0,NEG1             . YES, COMPUTE THE ABSOLUTE VALUE
           A        A0,ONE
           S        A0,TWO              . ARE THEY CLOSE ?
           TLEZ     A0
           J        D3NXTGTE            . NO.
           ST,      A2,D3RNGBUF         . YES, CLEAR THIS POSITION IN BUFFER
           A        A1,ONE              . INCREMENT THE COUNTER BY ONE
D3NXTGTE   S        IX,D3BUFBAD         . RESET INDEX
           JC       IX,S-D3BACK90       . LOOK FOR MORE HITS AT THIS RANGE

S        A1,FOUR             . WERE THERE 5 OR MORE HITS AT THAT RANGE ?
           TGEZ     A1
           J        D3NXTCHK            . NO.
           LD       A0,D3TEMP           . YES, PUT THIS RANGE INTO MOST LIKELY TABLE
           LD       IX,D3SAVIX2
           ST,      A0,D3MOSTLK         . STORE IN TABLE
           LD       A0,D3PSRCI          . INIT THE PSR COUNTER
           ST       A0,D3PSRCTR
           LD       A0,D3PSRHCI         . INIT THE PSR HIGH COUNTER

ST       A0,D3PSRHCT         . INIT THE HIGH PSR REJECT COUNTER
           S        IX,ONE              . DECREMENT POINTER
           ST       IX,D3SAVIX2
           TGEZ     IX                  . IS MAXIMUM EXCEEDED ?
           J        D3SETCLR            . YES, DONE
D3NXTCHK   LD       IX,D3SAVIX1
           JC       IX,S-D3BACK80       . GO BACK FOR NEXT RANGE GATE CHECK

DATE  04/04/78   PAGE 231

PAGE
D3SETCLR   LD       A0,ONE              . CLEAR THE HISTORY BUFFER DURING
           ST       A0,D3HISCLR         . REMAINING TURN AROUND TIME

. DECREMENT COUNTERS AFTER EACH HALF SCAN

LD       IX,TEN              . 11 COUNTERS
D3BACK95   LD,      A0,D3MEMCTR         . GET COUNTER
           S        A0,ONE              . DECREMENT
           TLZ      A0
           ST,      A0,D3MEMCTR         . SAVE
           TNZ      A0
           ST,      A0,D3MEMTBL         . CLEAR VALUE WHEN COUNTER =0
           JC       IX,S-D3BACK95

LD       IC,D3SCANAD         . RESUME THE SCAN
           PAGE

D3INRGN    LDA      A0,D3DATRDY         . IS THE SERIAL DATA READY FOR INPUT ?
           TEZ      A0                  . IF 0 THEN: THE DATA IS READY
           LD       IC,D3SCANAD         . CONTINUE THE SCAN
           ST       A0,D3HISCLR         . HISTORY BUFFER CLEAR FLAG = 0

. GET THE RANGE GATE DATA AND PUT INTO BUFFER

LD       IX,D3RBUFIX         . COMPUTE A NEW RNG GATE HISTORY BUFFER PNTR
           A        IX,ONE              . INCREMENT
           S        IX,D3NUMRNG         . WRAPAROUND PROTECTION
           TGEZ     IX
           A        IX,D3NUMRNG         . WRAP AROUND
           ST       IX,D3RBUFIX

SLL      IX,2                . X4
           A        IX,D3ARNGBF         . ADDRESS OF RANGE GATE HISTORY BUFFER
           JS       D3GETSRL            . GET DATA, UNPACK, LIMIT AND STORE DATA

. GET THE ANGLE DATA AND PUT INTO THE ANGLE BUFFER

LD       IX,D3ABUFIX         . COMPUTE A NEW ANGLE TABLE POINTER
           A        IX,ONE              . INCREMENT THE ANGLE HISTORY BUFFER POINTER
           S        IX,D3NUMANG         . PREVENT BUFFER OVERFLOW
           TGEZ     IX
           A        IX,D3NUMANG         . WRAP AROUND
           ST       IX,D3ABUFIX
```

```
                M       IX,SIX              . MULTIPLY BY 12
                A       MQ,D3BUFBAD         . OFFSET TO BUFFER BLOCK
                ST      MQ,D3SAVIX1

LD      IX,D3ELEVEN         . 12 ITEMS TO TRANSFER
D3BACK3         ST      IX,D3SAVIX2
                A       IX,D3FLBLKD         . OFFSET TO FILTER BLOCK
                LD,     A0,F2CLAMDE         . GET VALUE
                LD      IX,D3SAVIX2         . RESTORE COUNTER
                A       IX,D3SAVIX1         . POSITION IN THE 12X4 ANGLE TABLE
                ST,     A0,D3ANGBUF
                LD      IX,D3SAVIX2         . RESTORE COUNTER
                JC      IX,$-D3BACK3

. IF THE ANTENNA IS ON THE FIRST SCAN OR HAS JUST RESUMED SCANNING AFTER
. AUTO OR MANUAL REJECT (AZ = 0DEG) THEN DO NOT ALLOW ACQUISITION WHEN
. THE ANTENNA IS BELOW -3 DEGREES

LD      A0,D3AZ             . FIRST SCAN ?  (AZ= 0)
                TEZ     A0
                J       D3NOT1ST            . NOT 1ST SCAN
                LD      A0,D3ELEV           . IS ELEVATION BELOW -3DEGREES ?
                A       A0,D3P3DEG
                TGEZ    A0
                LD      IC,D3SCANAD         . BELOW -3 DEGREES, CONTINUE SCANNING
D3NOT1ST    .
. IF THE ANTENNA IS IN THE BUFFER REGION (END AND BEGINNING OF SCAN) THEN DO NOT
. ATTEMPT TO ACQUIRE TARGET

MAKE THE VALID AREA RECTANGULAR

LD      A1,D3DIR            . ANTENNA DIRECTION 0=UP,1=DOWN
                LD      A0,D3AJANG          . -(3*SINC)
                TEZ     A1
                N       A0,NEG1             . +(3*SINC)
                A       A0,D3ELEV           . ADD CURRENT ELEVATION ANGLE

S       A0,D3LOBFLM         . SUBTRACT THE LOWER LIMIT
                TGEZ    A0
                LD      IC,D3SCANAD         . IN LOWER BUFFER REGION
                S       A0,D3UMLBLM         . SUBTRACT THE UPPER - LOWER LIMIT
                TLEZ    A0
                LD      IC,D3SCANAD         . IN THE UPPER BUFFER REGION

. THE ALGORITHMS ........................

LD      IX,D3RBUFIX         . COMPUTE THE RNG GATE TABLE POINTER T-3
                S       IX,THREE
                TGEZ    IX
                A       IX,D3NUMRNG         . WRAP AROUND
                SLL     IX,2                . MULTIPLY BY 4
                A       IX,D3BUFBAD         . OFFSET TO BUFFER BLOCK

LD      MQ,THREE            . CHECK THE FOUR RANGE GATES FROM 3 TIMES AGO
D3BACK4         ST      IX,D3SAVIX1
                LD,     A0,D3RNGBUF         . DATA FROM HISTORY BUFFER
                ST      A0,D3CHKRNG
                TNZ     A0                  . GOOD VALUE ?
                LD      IC,D3SCANAD         . NO, CONTINUE THE SCAN

. A HIT WAS FOUND AT T-3 --- CHECK SINCE (T-0,T-1,T-2), MUST ALL BE MISSES
. AT THE RANGE THAT IS STORED IN D3CHKRNG

LD      IX,D3RBUFIX         . YES, THERE IS RANGE DATA 3 TIMES AGO
                LD      A2,TWO              . CHECK 3 TIMES SINCE
                LD      A1,ZERO             . ALLOWABLE NUMBER OF HITS AT CHKRNG =0
                JS      D3RNGCHK            . CHECK FOR A SIMILAR RANGE

TGEZ    A1                  . CHECK THE DOWN CNTR -- IF NEGATIVE THEN HIT
                J       D3NOTRGT            . ONE WAS FOUND, NOT A TARGET

. A HIT AT T-3 AND MISSES SINCE
. --- IF NO HITS AT T-7,T-8,T-9 OR T-10 THEN THIS MAY BE A TARGET

LD      IX,D3RBUFIX         . CHECK IF THERE WAS A SIMILAR RANGE BEFORE
                S       IX,SEVEN            . START CHECK AT T-7
                TGEZ    IX
                A       IX,D3NUMRNG         . WRAP AROUND
                LD      A2,THREE            . CHECK THE PREVIOUS 4 SAMPLES
                LD      A1,ZERO             .        NO ADDITIONAL HITS ALLOWED FOR TARGET
                JS      D3RNGCHK            . CHECK FOR A SIMILAR RANGE

TLZ     A1                  . IF THE DOWN CNTR IS NOT < 0 THEN TARGET
                J       D3SPAN4             . NO HITS
D3SWRST         LD      A0,D3CHKRNG         . THE SLIDING WINDOW ALGORITHM HAS REJECTED
                LD      IX,TWO              . THREE SWR RANGE BLANKING VALUES
D3BACK60        LD,     A1,D3SWR1           . THIS TARGET
                TEZ     A1                  . SAVE IN RANGE BLANKING TABLE FOR
                JC      IX,$-D3BACK60       .         SEARCHING FOR EMPTY SLOT
                ST,     A0,D3SWR1           . SAVE IN TABLE
                LD      A0,EIGHT
                ST,     A0,D3SWR1CT         . FOR 8  HALF SCANS
```

```
D3NOTRGT  LD      IX,D3SAVIX1    . A HIT WAS FOUND 3 TIMES AGO BUT NOT A TARGET
          A       IX,ONE         . TRY THE NEXT RANGE OUT
          JC      MQ,S-D3BACK4
          LD      IC,D3SCANAD    . CONTINUE THE SCAN

. DETERMINE IF THERE IS A HIT AT T-6

D3SPAN4   LD      IX,D3RBUFIX    . COMPUTE POINTER AT T-6
          S       IX,SIX
          TGEZ    IX
          A       IX,D3NUMRNG
          LD      A2,ZERO        . CHECK ONE SAMPLE
          LD      A1,ZERO        . ZERO HITS
          JS      D3RNGCHK

ST      A1,D3HIT4FL    . = -1 IF GOT HIT AT T-6, 0 IF NOT

. ALL NORMAL TARGET FINDING TECHNIQUES HAVE FOUND TARGET - NOW .....
.           IF ONLY ONE HIT THEN IGNORE
.           IF 2 HITS THEN CHECK TABLE OF RECENT 2 HIT CANDIDATES,.
.                  IF IT IS THERE THEN ACQUIRE THIS TARGET
.                  IF NOT THERE THEN PUT THIS NUMBER INTO TABLE BUT DO NOT ACQ
.           IF 3 HITS THEN ACQUIRE THIS TARGET

D3TWOHIT  LD      IX,D3RBUFIX    . COMPUTE IX AT T-4
          S       IX,FOUR
          TGEZ    IX
          A       IX,D3NUMRNG
          LD      A2,ONE         . EXAMINE 2 SAMPLES ( T-4 AND T-5 )
          LD      A1,ONE         . ON RETURN: 1=NONE , 0=ONE , -1=TWO HITS
          JS      D3RNGCHK

TGZ     A1             . A1 = 1 IF NO MORE HITS
          J       D3HIT1
          LD      A1,D3HIT4FL    . IF HIT AT T-6 THEN BLANK THIS RANGE
          TEZ     A1
          J       D3SWRST
          J       D3NOTRGT

D3HIT1    TLZ     A1             . A1 = -1 IF TWO MORE HITS
          J       D3SAVRNG       . A1 = 0 IF ONE MORE HIT
          LD      A1,D3HIT4FL
          TNZ     A1             . A1 = 0 IF NO HIT AT T-6
          J       D3CKBLNK

D3SAVRNG  LD      IX,THREE       . ONLY 2 HITS , CHECK TABLE (4 VALUES )
D3BACK30  LD,     A0,D3HIT2TB
          TGZ     A0
          J       D3NXT2HT       . NOTHING THERE TRY NEXT
          S       A0,D3CHKRNG    . IS IT CLOSE ?
          TLZ     A0
          J       $+3
          N       A0,NEG1        . COMPUTE ABSOLUTE VALUE
          A       A0,ONE
          S       A0,FIVE        . WITHIN 5 CELLS (1000 FT)
          TLEZ    A0
          J       D3NXT2HT       . NOT WITHIN RANGE TOLERANCE
          LD,     A0,D3HIT2CT    . IF THERE WERE 2 HITS AT THIS RANGE ON THIS
          S       A0,EIGHT       . SCAN THEN BLANK OUT THIS RANGE
          TEZ     A0
          J       D3CKBLNK       . GOOD 2 HIT OR 4 HIT TARGET FIND
          ST,     A0,D3HIT2CT    . ZERO COUNTER
          ST,     A0,D3HIT2TB    . CLEAR 2 HIT RANGE
          J       D3SWRST        . GO SET IN BLANKING RANGE
D3NXT2HT  JC      IX,S-D3BACK30

. PUT THIS RANGE CELL NUMBER INTO THE 2 HIT TABLE
.
          LD      A0,D3CHKRNG    . RANGE NUMBER
          LD      IX,THREE       . 4 POSSIBLE
          LD,     A1,D3HIT2TB    . GET TABLE VALUE
          TEZ     A1             . FIND AN EMPTY SLOT
          JC      IX,2
          ST,     A0,D3HIT2TB    . PUT INTO TABLE (IF NO EMPTY SLOTS FIRST POS
          LD      A0,D32H4HCI    . SET END OF 1/2 SCAN COUNTER
          ST,     A0,D3HIT2CT
          J       D3NOTRGT       . IGNORE

. DO NOT GO TO TARGET ACQ IF THIS POSSIBLE TARGET IS WITHIN 4 RNG GATES
.    OF THE MOST LIKELY ALTITUDE OR SWR OR PRR  AUTO OR MANUAL

D3CKBLNK  LD      IX,SIX         . 7 POSSIBLE BLANKING RANGE GATE NUMBERS
D3BACK40  LD,     A0,D3MOSTLK    . MOST LIKELY FROM PREVIOUS HALF SCAN
          TGZ     A0             . IF ZERO THEN GO TO NEXT
          J       D3NXTLK
          S       A0,D3CHKRNG    . NO, IS IT NEAR THE POSSIBLE TARGET ?
          TLZ     A0             . GET THE ABSOLUTE VALUE
          J       $+3
          N       A0,NEG1
          A       A0,ONE
          S       A0,FOUR        . IS IT CLOSE ?
          TGZ     A0
          J       D3NOTRGT       . BLANKED OUT --- DO NOT ACQUIRE
          JC      IX,S-D3BACK40  . GO BACK UNTIL ALL MOST LIKELY VALUES CHECKED
D3NXTLK   JC      IC,(D3TARGET)  . TARGET IS NOT BLANKED
          LDA
```

```
      PAGE
$(D3PROG1)
.
. $$$$$$$$$$$$$$$$$$$$ A TARGET WAS FOUND $$$$$$$$$$$$$$$$$$$$$$$$$$$$$$$$$$$$$$$$$$

D3TARGET  LD     A0,D3CHKRNG     . SAVE TARGET RANGE FOR POSSIBLE REJECT
          ST     A0,D3LASTGT     . CONVERT TO
          SLL    A0,7            .                               FEET SCALED 16
          M      A0,D3RNGMSF     .
          ST     A0,D3TGARNG     . TARGET ACQUISITION RANGE ANALOG OUTPUT
          LD     A2,TWO          . SET THE CCAA MODE TO 2 (TARGET ACQUISITION)
          STA    A2,D3CAAMOD

. CLEAR THE SCAN FLAG --- STOP THE ANTENNA EL SCAN

LD     A0,ZERO
          ST     A0,D3SCNFLG
          LD     IC,D3TAINAD     . GO TO TARGET ACQ INIT
      PAGE
$(D3PROG1)
.
. TARGET ACQUISITION MODE INITIALIZATION
. SWEEP THE RANGE OUTPUT VOLTAGE OVER THE TARGET
.
D3TGACIN  LD     A0,D3TGARNG     . RANGE FROM THE TARGET DETECTOR
          S      A0,D3PRESWP     . COMMAND THE PREDICTED RANGE TO BEFORE TARGET
          S      A0,D3MNTGAR     . MAKE SURE THAT THIS NEW VALUE IS > MIN ALLOW
          TGZ    A0
          LD     A0,ZERO         . BELOW MINIMUM - LIMIT TO MINIMUM
          A      A0,D3MNTGAR     .
          ST     A0,D3TGARNG     .                     TARGET
          A      A0,D3C1KFT      . AND TO 1000 FEET BEYOND AFTER APPLYING
          A      A0,D3C1KFT      . FULL ACTION
          ST     A0,D3RNGLIM
          LD     IX,D3IOBLKD     . OFFSET TO I/O SCRATCH BLOCK
          LD,    A0,CLOCK        . GET PRESENT TIME
          STA    A0,D3FLACLK     . SAVE IN FULL ACTION CLOCK

.
. ------------------------------------------------------------
.
. COMPUTE THE PROPER ANTENNA POSITION TO PUT THE ANTENNA OVER THE TARGET

D3TGTACQ  .
          JS     D3NOWPOS        . ROTATIONS

LD     IX,D3IOBLKD     . OFFSET TO I/O SCRATCH BLOCK
          LDA    A2,D3FLACLK     . START TIME OF THIS ACQUISITION
          S,     A2,CLOCK        . MINUS PRESENT TIME
          A,     A2,D3T100MS     . PLUS 100MSEC
          TLZ    A2              . HAS 100 MSECS PASSED ?
          LDA    IC,(EXECOP)     . NO - RETURN TO EXEC
          A,     A2,D3T800MS     . PLUS 800 800MSEC
          TGZ    A2              . HAS 900 MSECS PASSED ?
          J      D3NOACQ         . YES, NO ACQUISITION - RESUME SCAN
          LD     A1,ONE          . NO, SET FULL ACTION
          ST,    A1,I2FULLAC
          LD     A0,D3RNGLIM     . AND SWEEP PRED RNG
          ST     A0,D3TGARNG
          LDA    IC,(EXECOP)     . RETURN TO EXEC

. AN ACQUISITION WAS ATTEMPTED BUT DID NOT LOCK ON

D3NOACQ   LD     A0,D3LASTGT     . BLANK OUT THIS RANGE FOR 6 MORE HALF SCANS
          ST     A0,D3PRRA
          LD     A0,D3ARJCI      . INIT AUTOMATIC REJECT COUNTER
          ST     A0,D3PRACTR
          PAGE

.
. ------------------------------------------------------------
. SKIP OVER MODE *IF RADAR RANGE LOCK IS ON  (MSRNGLCK=1)
.               *.  THEN: ANTENNA SERVO AZIMUTH = CURRENT AZIMUTH
.               *.        ANTENNA SERVO ELEVATION = CURRENT ELEVATION
.               *.        VALID RADAR RANGE = CURRENT RANGE
.               *.        DO THE ANALOG OUTPUTS AND RETURN TO INTERRUPT EXEC
.               *IF THE SERIAL DATA IS READY
.               *.  THEN: GET THE DATA FROM THE DMA
.               *.        UNPACK THE RANGE DATA
.               *.        IF ANY RANGE GATE IS GREATER THAN THE RANGE INPUT
.               *.         .  THEN: IF THAT RANGE IS LESS THAN 5 MILES
.               *.         .          .  THEN: TARGET ACQ RANGE = THIS RANGE
.               *.         .          .        DO TARGET ACQ INITIALIZATION
.               *.         .          .  ELSE: (BELOW)
.               *.         .  ELSE: AZIMUTH SERVO OUTPUT = 0 DEGREES
.               *.         .        DO NOTHING COUNT = 17
.               *.         .        CCAA MODE NUMBER = 1 (SCANNING)
.
. ------------------------------------------------------------

D3SKPOVR  LD     A0,ZERO         . CLEAR THE SCAN FLAG --- STOP THE ANTENNA EL
          ST     A0,D3SCNFLG
          LD     A0,D3RNG        . RADAR RANGE INPUT FROM WHEN RANGE LOCK ON
          LD     A1,I3SCMODE     . SCALE MODE      1 = SCLD 16    0 = SCLD 18
          TEZ    A1
          SRL    A0,2            . CONVERT TO SCLD 18
          M      A0,D3REVMSF     . MAKE COMPATIBLE TO RANGE GATE
          A      A0,D3RNGTOL     . MINIMUM DISTANCE TO THE NEXT VALID TARGET
          ST     A0,D3CHKRNG
```

```
           LDA     A0,D3DATRDY     . IS THE SERIAL READY ?
           TEZ     A0              . IF ZERO IT IS
           LDA     IC,(EXECOP)     . NO, RETURN TO THE EXECUTIVE
           LD      IX,D3ATMPBF     . ADDRESS OF TEMPORARY BUFFER
           JS      D3GETSRL        . GET, UNPACK AND STORE THE SERIAL DATA

LD      IX,ZERO         . START LOOKING AT THE LOWEST OF THE 4 RANGES
           LD      A3,THREE
D3BACK8    LD,     A0,D3TMPBUF     . GET THE RANGE GATE NUMBER
           A       IX,ONE
           TNZ     A0              . IF IT IS ZERO THEN RNG IS GREATER THAN MAX
           J       D3NOMTGT        . OR NO MORE DATA  (RESUME SCAN AND WAIT)
           S       A0,D3PSR        . IS THIS RANGE MOST LIKELY ALT ?
           TLZ     A0
           J       S+3
           N       A0,NEG1         . ABSOLUTE VALUE
           A       A0,ONE
           S       A0,FOUR
           TGZ     A0
           JC      A3,S-D3BACK8    . CLOSE, TRY THE NEXT RANGE
           LD,     A0,D3TMPBUF-1   . RESTORE THE RANGE GATE NUMBER
           S       A0,D3CHKRNG     . CURRENT RANGE
           TLZ     A0              . IS THERE A GREATER RANGE ?
           J       D3OKRNG         . YES, NOW ATTEMPT TO ACQUIRE THIS TARGET
           JC      A3,S-D3BACK8

D3NOMTGT   LD      A0,D3LASTGT     . NO MORE TARGETS , BLANK OUT THE RANGE
           ST      A0,D3PRRM       . FOR THE NEXT 3   HALF SCANS
           LD      A0,D3MRJCI      . INIT THE MANUAL REJECT COUNTER
           ST      A0,D3PRMCTR

. MAKE THE AZ OUTPUT = 0 FOR REJECTED ATTEMPTED ACQ S  (USED FOR PSR CHECK)
D3MOVAWY   LD      A0,ZERO         . NO MORE GREATER RANGE TARGETS AT THIS ANGLE
           ST      A0,D3AZ         .  MOVE THE AZIMUTH TO CENTER
           LC      A0,D3DONTHI     . DO THE REGULAR SCAN BUT DO NOT PROCESS
           ST      A0,D3DONTHC     .  ANY DETECTOR DATA UNTIL ITS SCANNED 10 DEG
           LD      A0,ONE          . MODE NUMBER = 1
           STA     A0,D3CAAMOD     .  SCANNING

LD      A0,D3ELEV       . START SCAN WHERE ANTENNA IS NOW
           ST      A0,D3EL
           ST      A0,D3ELS
           ST      A0,D3OEL
           LD      IC,D3SCANAD

D3OKRNG    LD,     A0,D3TMPBUF-1   . GET THE VALID RANGE
           SLL     A0,7
           M       A0,D3RNGMSF     . CONVERT TO FEET SCALED 18
           ST      A0,D3TGARNG     . TARGET ACQ RANGE ANALOG VOLTAGE OUTPUT
           LD      A2,TWO          . MODE NUMBER = 2  (TARGET ACQUISITION)
           STA     A2,D3CAAMOD

LD      IX,D3ABUFIX     . COMPUTE ANGLE BUFFER IX AT T-4
           S       IX,FOUR
           TGEZ    IX
           A       IX,D3NUMANG
           M       IX,SIX          : X12
           A       MQ,D3BUFBAD     : OFFSET TO BUFFER BLOCK
           ST      MQ,D3SAVIX1

LD      IX,D3ELEVEN     . TRANSFER CURRENT ANGLES TO ANGLE HISTORY BUF
D3BACK98   ST      IX,D3SAVIX2
           A       IX,D3FLBLKD
           LD,     A0,F2CLAMDE
           LD      IX,D3SAVIX2
           A       IX,D3SAVIX1
           ST,     A0,D3ANGBUF
           LD      IX,D3SAVIX2
           JC      IX,S-D3BACK98

LD      IC,D3TAINAD     . GO TO TARGET ACQ INITIALIZATION
           PAGE
. -----------------------------------------------------------------------------
.
. THIS SUBROUTINE SCANS THE RANGE GATE HISTORY BUFFER FOR RANGES NEAR THE
. VALUE IN D3CHKRNG.  THE MAX NUMBER OF CHECKS =A2-1, STARTING AT THE POINTER
. IN THE IX REGISTER AND WORKING TOWARD OLDER DATA.  DO NOT CHANGE MQ
. -----------------------------------------------------------------------------
D3RNGCHK  . IX - CONTAINS THE TIME IX INTO THE 4X9 RNG HISTORY BUFFER FOR START
          . A1 - CONTAINS THE ALLOWABLE NUMBER OF HITS IN THE REGION BEING
          .      CHECKED, RETURN WHEN THIS NUMBER GOES NEGATIVE
          . A2 - CONTAINS THE NUMBER OF TIMES TO BE CHECKED  -- MINUS ONE
          . MQ - NOT USED -- DO NOT DISTURB, BEING USED BY CALLING PROGRAM

D3BACK5    ST      IX,D3SAVIX2     . SAVE THE HISTORY BUFFER POINTER
           SLL     IX,2            . X4  (4X9 ARRAY)
           LD      A3,THREE        . FOUR RANGES AT THIS TIME TO BE CHECKED
           A       IX,D3BUFBAD     . BUFFER BLOCK OFFSET
D3BACK6    LD,     A0,D3RNGBUF
           TNZ     A0              . ANY MORE THIS TIME ?
           J       D3NXTIME        . NO, CHECK NEXT TIME
           S       A0,D3CHKRNG     . MINUS THE CHECK RANGE
           TLZ     A0              . GET THE ABSOLUTE VALUE
           J       S+3             . POSITIVE
           N       A0,NEG1         . 2'S COMPLEMENT
           A       A0,ONE
```

```
                S       A0,D3TOLER        . ARE THEY WITHIN THE TOLERANCE ?
                TGZ     A0
                J       D3GOTHIT          . YES, GOT HIT
                A       IX,ONE            . NO
                JC      A3,S-D3BACK6      . GO BACK TO CHECK THE NEXT RANGE
D3NXTIME        LD      IX,D3SAVIX2       . RANGE BUFFER POINTER
                S       IX,ONE            . DECREMENT
                TGEZ    IX
                A       IX,D3NUMRNG       . WRAP AROUND
                JC      A2,S-D3BACK5      . GO BACK FOR NEXT TIME
                J       D3DONE
D3GOTHIT        S       A1,ONE            . DOWN COUNTER
                TLZ     A1
                J       D3NXTIME          . CHECK NEXT TIME FRAME FOR MORE HITS
D3DONE          LD      IC,ADEXIT         . RETURN TO CALLING ROUTINE
                PAGE
```

. ---------------------------------------------------------------------------
. THIS SUBROUTINE INPUTS THE RANGE SERIAL DATA FROM THE AUTO-ACQ BOX VIA SERIAL
.      IT UNPACKS THE 4  8BIT WORDS
.      IT REPLACES ANY RANGE GREATER THAN THE MAX ALLOWED WITH 0
.      IT STORES THE 4 VALUES STARTING AT THE ADDRESS IN THE IX REGISTER
. ---------------------------------------------------------------------------

```
D3GETSRL        ST      IX,D3SAVIX1       . ADDRESS OF WHERE THE 4 WORDS GO
```
. DECREASE THE MAXIMUM DETECTOR RANGE AS A FUNCTION OF ANT ELEVATION ANGLE
.
.           ELEV>  -3DEG  =>    MAXRNG =  30000 FT
.   -3DEG >ELEV>  -6DEG   =>    MAXRNG =  12000 FT
.   -6DEG >ELEV>  -9DEG   =>    MAXRNG =   8000 FT
.   -9DEG >ELEV> -12DEG   =>    MAXRNG =   6000 FT
.           ELEV< -12DEG  =>    MAXRNG =   4500 FT

```
                LD      A0,D3ELEV         . CURRENT ELEVATION
                LD      IX,FOUR
                A       A0,D3P3DEG        . +3 DEGREES
                TGZ     A0                . POSITIVE ?
                JC      IX,2              . NO, STILL LOWER
                LD,     A0,D3MXRTAB       . GET RANGE FROM TABLE
                ST      A0,D3MAXRNG       . STORE IN MAX RANGE
```
. INPUT THE TWO AUTO ACQ WORDS INTO D3SRLDT1 AND D3SRLDT2
.
```
                LD      A0,ZERO           . MODE = DIGIBUS
                O       A0,0137
                LD      A0,D3DATADR       . ADDRESS OF 2-WORD BUFFER
                O       A0,0134
                LD      A0,D3READBT       . SET THE READ BIT
                A       A0,D3CAASTA       . CAA STATION CODE
                A       A0,TWO            . NUMBER OF WORDS = 2
                O       A0,0136
                LD      A0,D3WAITCT
                TIO                       . WAIT FOR SERIAL TRANSFER
                JC      A0,1              . MAX WAIT = ABOUT 100 USECS
```
. OUTPUT SETUP CONTROL WORD TO CCAA BOX
.
```
                LD      A0,D3CAAOAD       . ADDRESS OF CONTROL WORD CONSTANT
                O       A0,0134
                LD      A0,D3CAASTA       . CAA STATION CODE
                A       A0,ONE            . NUMBER OF WORDS = 1
                O       A0,0136
                LD      A0,ONE
                STA     A0,D3DATRDY       . THIS FLAG IS CLEARED FROM DAA BOX INTERRUPT
                LD      IX,THREE
D3BACK9         SRL     IX,1              . MAKE 3 AND 2 A 1  AND  1 AND 0 A 0
                LDA,    A0,D3SRLDT1       . GET THE RAW DATA
                TNS                       . CHECK IX BEFORE SHIFT
                J       S+4
                SLL     A0,8              . WAS EITHER 2 OR 0 - RESTORE  (DATA IN LOWER)
                SLL     IX,1
                J       S+2
                SLF     IX,1              . WAS EITHER 3 OR 1 - RESTORE  (DATA IN UPPER)
                SRL     A0,8              . NOW 1 8 BIT RANGE GATE RIGHT JUSTIFIED
                S       A0,D3MAXRNG       . IS IT GREATER THAN THE MAX ALLOWED RANGE ?
                TLZ     A0
                J       S+3
                A       A0,D3MAXRNG       . NO, RESTORE AND USE THIS RANGE
                J       S+2
                LD      A0,ZERO           . YES, SET TO ZERO
                A       IX,D3SAVIX1       . ADD ADDRESS OF WHERE DATA GOES
                ST,     A0,0              . STORE DATA
                S       IX,D3SAVIX1
                JC      IX,S-D3BACK9      . GO BACK
                LD      IC,ADEXIT         . RETURN TO CALLING ROUTINE
```
.
.
.
```
D3SETSCN        LD      A0,ONE            . SET THE SCAN FLAG -- DO THE EL SCAN
                ST      A0,D3SCNFLG       . UNDER THE INTERVAL TIMER INTERRUPT
                LDA     IC,(EXECOP)       . RETURN TO THE EXEC
                PAGE
S(D3PROG3)
```
. ------------------ ROTATION SUBROUTINE ------------------------------

. COMPUTE THE PROPER ANTENNA POSITION TO PUT THE ANTENNA OVER THE TARGET NOW

```
D3NOWPOS LDA     A0,RETURN
         A       A0,ONE
         ST      A0,D3TEMP2
         LD      IX,D3ABUFIX     . COMPUTE THE ADDRESS OF (T-4) IN ANGLE BUFFER
         S       IX,FOUR
         TGEZ    IX
         A       IX,D3NUMANG     . WRAP AROUND
         M       IX,SIX          . MULTIPLY BY 12
         ST      MQ,D3SAVIX1     . PUT IN INDEX REG
         LD      IX,D3SAVIX1
         A       IX,D3BUFBAD     . OFFSET TO BUFFER BLOCK
```

. ROTATE THE TARGET AT T-4 TO PRESENT ANTENNA COORDINATES

```
         LD,     A0,D3ANGBUF+2   . COS(LAMBDA)
         M,      A0,D3ANGBUF     .   X COS(LAMBDE)
         LD,     A1,D3ANGBUF+3   . SIN(LAMBDA)
         M,      A1,D3ANGBUF     .   X COS(LAMBDE)
         LD      A2,ZERO         .
         S,      A2,D3ANGBUF+1   . -SIN(LAMBDE)

A       IX,BLOCK        . ABSOLUTE ADDRESS OF ANGLE HISTORY BUFFER
         A       IX,FOUR         . ADDRESS OF COS(-2DEG) AT TIME -3

LD      MQ,INVAXIS2
         JS      RROTATER

A       IX,TWO
         LD      MQ,INVAXIS1
         JS      RROTATB

A       IX,TWO
         LD      MQ,INVAXIS2
         JS      RROTATB

A       IX,TWO
         LD      MQ,INVAXIS3
         JS      RROTATB

LD      IX,D3ACSPSI
         LD      MQ,AXIS3
         JS      RROTATER

S       IX,TWO
         LD      MQ,AXIS2
         JS      RROTATB

S       IX,TWO
         LD      MQ,AXIS1
         JS      RROTATB

S       IX,TWO
         LD      MQ,AXIS2
         JS      RROTATB
```

. COMPUTE THE AZIMUTH AND ELEVATION ANGLE

```
         JS      NORM2R

ST      A2,D3TEMP1
         ST      A3,D3TEMP
         JS      ARCTN2

ST      A0,D3AZ         . AZIMUTH
         LD      A0,D3TEMP
         LD      A1,ZERO
         S       A1,D3TEMP1
         JS      ARCTN2

ST      A0,D3EL         . ELEVATION
         LD      IC,D3TEMP2      . RETURN
         PAGE
```

. *********************************************************************
. THIS ROUTINE IS CALLED FROM THE INTERRUPT EXEC (INTERVAL TIMER -- 150 (PS)
S(D3PROG3)

D3CCAA   . COMPUTER CONTROLLED AUTO ACQUISITION

```
                LD      A0,D3SCBLK      . SET THE BLOCK REGISTER
                SLL     A0,8
                XB      A0
.
. DON:T DO ANYTHING WHILE TARGET REJECT IS ON
.
                LD      IX,D3IOBLKD     . OFFSET TO IO SCRATCH BLOCK
                LD,     A0,I2TGTRJ
                TEZ     A0
                J       D3NOSCAN
.
. DECREMENT THE DO NOTHING COUNTER
.
                LD      A0,D3DONTHC
                S       A0,ONE
                TLZ     A0
                ST      A0,D3DONTHC
.
                LD      A0,D3SCNFLG     . SCAN FLAG, ON THEN SCAN THE ANTENNA
                TNZ     A0
                J       D3NOSCAN        . NO.
.
. SCAN THE ANTENNA
.
D3SCAN          LD      IX,D3DIR        . DIRECTION 0 - UP , 1 - DOWN
                LD,     A0,D3LIMIT      . LIMIT     OF SCAN IN THIS DIRECTION
                S       A0,D3ELS
                M,      A0,D3RHO
                TLZ     A0              . PAST LIMIT ?
                J       D3COMP          . NO, CONTINUE IN SAME DIRECTION
D3CHANGE        LD      IX,ONE          . CHANGE DIRECTION
                S       IX,D3DIR
                ST      IX,D3DIR
                LD,     A0,D3AZBAR      . CHANGE THE ANTENNA AZ BAR
                ST      A0,D3AZ
D3COMP          LD      A0,D3ELS        . COMPUTE THE NEW ANTENNA ELEVATION
                S       A0,D3OEL
                M       A0,D3C
                A,      A0,D3RHO
                A       A0,D3ELS
                LD      A1,D3ELS
                ST      A1,D3OEL
D3NXTPOS        ST      A0,D3EL         . NEW POSITION
                ST      A0,D3ELS
                LD      A0,D3MNTGAR     . SET THE PREDICTED RANGE AT MIN WHILE SCANNIN
                ST      A0,C3TGARNG
                J       D3ANLOUT        . GO DO THE ANALOG OUTPUTS
D3BRST          ST      A0,D3OEL        . BORESIGHT THE ANTENNA (0,0)
                ST      A0,D3AZ
                ST      A0,D3DIR        . START NEXT SCAN UP
                J       D3NXTPOS
.
. IF NO SCAN THEN CHECK FOR SKIPOVER MODE
.
D3NOSCAN        LDA     A0,D3CAAMOD     . SKIPOVER MODE IS 3
                S       A0,THREE
                TEZ     A0
                J       D3ANLOUT
                LD      IX,D3IOBLKD     . WAIT FOR RANGE LOCK TO GO AWAY
                LD,     A1,M5RNGLCK     .    BEFORE LOOKING FOR A NEW TARGET
                TNZ     A1
                J       D3ANLOUT        . GO TO ANALOG OUTPUTS PROCESSING
                LD,     A0,M5SCMODE     . SAVE THE CURRENT SCALE MODE
                ST      A0,D3SCMODE
                LD      IX,D3FLBLKD     . OFFSET TO FILTER SCRATCH BLOCK
                LD,     A0,F2RNG        . CURRENT RANGE INPUT
                ST      A0,D3RNG        . USED AFTER RANGE LOCK IS LOST TO CHK NEXT
                LD      IX,TWO          . HOLD THE ANTENNA WHERE IT IS NOW
D3BACK97        ST      IX,D3SAVIX1     . (D3SAVIX1 CAN BE USED UNDER THE INTER UPT
                A       IX,D3FLBLKD     .    BECAUSE RNG LOCK =1 SO CCAA NOT CALLED)
                LD,     A0,F2CLAMDE     . COSINE
                LD,     A1,F2SLAMDE     . SINE
                JS      ARCTN2          . UPON RETURN A0=DEG/180     SCL 0

LD      IX,D3SAVIX1
                SRL     IX
                ST,     A0,D3EL         . ANTENNA COMMANDED POSITION
                JC      IX,$-D3BACK97
.
. ANALOG  OUTPUTS FOR DIGITAL AUTO-ACQ , ACQ RNG, ANT AZ AND EL
.
D3ANLOUT        LD      A2,D3ANTCT      . NUMBER OF OUTPUTS - 1
                LD      IX,D3ANTPTR
                LD      A3,ONE
                LDA     IC,(I2AOSBI)
```

```
                PAGE
. ************************** D3BIT ******************************************
S(D3BITBLK)

D3DAABIT  LD     A0,ZERO
          LD     A1,ONE
          LD     A2,D3DAANWS      . AUTO-ACQ BUTTON, CHECK FOR
          LD     A3,D3OAANWS      . LEADING EDGE
          ST     A2,D3OAANWS
          TEZ    A2
          TEZ    A3
          J      D3B2JMP          . NO
          ST     A1,I2TGTRJ       . YES, LEADING EDGE DETECTED
          LD     A2,CLOCK         . SET REJECT AND SAVE CURRENT TIME
          STA    A2,D3TRJCLK
          STA    A1,D3CAAMOD      . SET SUB MODE TO REJECT (=1)

. GO TO SUB-MODE PROCESSING ADDRESS

D3B2JMP   LD     A2,D3SCBLK       . SET BLOCK REGISTER TO CCAA SCRATCH BLOCK
          SLL    A2,8
          XB     A2
          LDA    IX,D3CAAMOD
          J,     D3B2TAB
D3B2TAB   J      D3B2SRCH         . 0 - LOOKING FOR TARGET    (SEARCHING)4
          J      D3B2TGTR         . 1 - TARGET REJECTING
          J      D3B2TGTA         . 2 - TARGET ACQUISITION

. SEARCHING FOR BIT TARGET

D3B2SRCH  LD     IX,D3B2BLKD      . OFFSET TO BIT SCRATCH BLOCK
          LD,    A2,D3RNGLCK      . SEARCHING MODE, IF RNG LOCK THE DO NOTHING
          TEZ    A2
          J      D3B2RETN
          LDA    A2,D3DATRDY      . IS SERIAL DATA READY ?
          TEZ    A2
          J      D3B2RETN         . NO, DO OUTPUT PROCESSING
          LD     A0,ZERO
          ST     A0,D3ELEV        . ZERO THE ANGLE USED FOR MAXRNG LIMITING
          LD     IX,D3ATMPBF      . YES, GET DETECTOR DATA
          JS     D3GETSRL

LD     IX,ZERO
          LD     A3,THREE
D3B2BK8   LD,    A0,D3TMPBUF      . LOOK FOR NEXT TARGET OUT
          A      IX,ONE
          TNZ    A0
          J      D3B2NMT          . 0 - NO MORE TARGETS
          S      A0,D3CHKRNG      . OLD TARGET RANGE NUMBER
          S      A0,TWO           . TOLERANCE = 2 RANGE GATES
          TLEZ   A0
          J      D3B2OKR          . NEW RANGE IS GREATER THAN OLD - ACQUIRE
          JC     A3,S-D3B2BK8     . GO TO NEXT TARGET CHECK
          LD     IX,ONE           . ALL TGTS EXHAUSTED - USE THE FIRST ONE
D3B2OKR
D3B2NMT   LD,    A0,D3TMPBUF-1    . GET THE RANGE GATE NUMBER
          TNZ    A0
          J      D3B2RETN         . IF ZERO THEN NO TARGETS PRESENT
          ST     A0,D3CHKRNG      . SAVE THIS RANGE FOR NEXT CHECK
          SLL    A0,7             . CONVERT TO RANGE SCALED 18
          M      A0,D3RNGMSF
          ST     A0,D3TGARNG
          LD     A2,TWO           . MODE = TARGET ACQUISITION (2)
          STA    A2,D3CAAMOD

S      A0,D3PRESWP      . SET PREDICTED RANGE TO BEFORE TARGET
          S      A0,D3MNTGAR      . IF LESS THAN THE MIN ALLOWED THE SET TO MIN
          TGZ    A0
          LD     A0,ZERO
          A      A0,D3MNTGAR
          ST     A0,D3TGARNG
          A      A0,D3C1KFT       . + 1000 FEET
          A      A0,D3C1KFT       . + 1000 FEET
          ST     A0,D3RNGLIM      . SAVE FOR PRED RANGE AFTER FULL ACT
          LD     IX,D3B2BLKD      . IS APPLIED
          LD,    A1,CLOCK         . SAVE CURRENT TIME
          STA    A1,D3FLACLK
          J      D3B2RETN

. REJECTING TARGET

D3B2TGTR  LD     IX,D3B2BLKD      . OFFSET TO BIT SCRATCH BLOCK
          LDA    A2,D3TRJCLK      . TIME WHEN TARGET REJECT WAS FIRST APPLIED
          S,     A2,CLOCK         . - CURRENT TIME
          A,     A2,D3T100MS      . + 100 MSECS
          TGZ    A2
          STA    A0,D3CAAMOD      . 100 MSECS EXCEEDED, RETURN TO SEARCHING MODE
          ST,    A1,I2TGTRJ       . TARGET REJECT OUTPUT = 1
          J      D3B2RETN         . RETURN

. TARGET AQUISITION

D3B2TGTA  LD     IX,D3B2BLKD      . OFFSET TO BIT SCRATCH BLOCK
          LDA    A2,D3FLACLK      . TIME WHEN TARGET WAS FOUND
          S,     A2,CLOCK         . - PRESENT TIME
          A,     A2,D3T100MS      . + 100 MSECS
          TLZ    A2
          J      D3B2RETN         . NOT 100 MSECS YET
          A,     A2,D3T800MS      . HAS 900 MSECS PASSED ?
          TGZ    A2
```